(12) United States Patent
Matsuura

(10) Patent No.: US 11,137,415 B2
(45) Date of Patent: Oct. 5, 2021

(54) VIBRATING DEVICE, VIBRATING DEVICE MODULE, ELECTRONIC APPARATUS, AND VEHICLE

(71) Applicant: Seiko Epson Corporation, Tokyo (JP)

(72) Inventor: Yoshiyuki Matsuura, Suwa (JP)

(73) Assignee: Seiko Epson Corporation

( * ) Notice: Subject to any disclaimer, the term of this patent is extended or adjusted under 35 U.S.C. 154(b) by 609 days.

(21) Appl. No.: 16/017,025

(22) Filed: Jun. 25, 2018

(65) Prior Publication Data

US 2018/0372773 A1 Dec. 27, 2018

(30) Foreign Application Priority Data

Jun. 26, 2017 (JP) .............................. JP2017-124208

(51) Int. Cl.
| | |
|---|---|
| G01P 15/125 | (2006.01) |
| G01P 15/08 | (2006.01) |
| G01P 15/13 | (2006.01) |
| H01L 29/84 | (2006.01) |

(52) U.S. Cl.
CPC ........ *G01P 15/125* (2013.01); *G01P 15/0894* (2013.01); *G01P 15/131* (2013.01); *G01P 2015/0831* (2013.01)

(58) Field of Classification Search
CPC .. G01P 15/125; G01P 15/0894; G01P 15/131; G01P 2015/0831; H01L 29/84
See application file for complete search history.

(56) References Cited

U.S. PATENT DOCUMENTS

| | | | |
|---|---|---|---|
| 5,205,171 A | * | 4/1993 | O'Brien ............ G01C 19/5719 |
| | | | 73/514.18 |
| 5,892,153 A | | 4/1999 | Weinberg et al. |
| 6,240,782 B1 | | 6/2001 | Kato et al. |
| 7,302,847 B2 | | 12/2007 | Ito et al. |
| 9,476,905 B2 | | 10/2016 | Takagi |
| 9,568,491 B2 | | 2/2017 | Weber et al. |
| 9,577,604 B2 | | 2/2017 | Takebayashi et al. |
| 9,817,020 B2 | | 11/2017 | Yoda |
| 2006/0037397 A1 | | 2/2006 | Memishian |
| 2006/0055096 A1 | | 3/2006 | Ito et al. |

(Continued)

FOREIGN PATENT DOCUMENTS

| | | |
|---|---|---|
| EP | 0395922 A1 | 11/1990 |
| JP | 2000-275272 A | 10/2000 |

(Continued)

OTHER PUBLICATIONS

Extended European Search Report for Patent Application No. EP18179509.7, dated Sep. 21, 2018 (8 pages).

*Primary Examiner* — Daniel S Larkin
*Assistant Examiner* — Anthony W Megna Fuentes
(74) *Attorney, Agent, or Firm* — Harness, Dickey & Pierce, P.L.C.

(57) ABSTRACT

A vibrating device includes: a base body containing mobile ions; a movable member disposed facing and spaced apart from the base body; and a conductor section disposed so as to cover at least a portion of the movable member. A first voltage whose potential periodically changes based on a reference potential is applied to the movable member. A second voltage that is at the reference potential when time-averaged is applied to the conductor section. The second voltage is constant at the reference potential.

20 Claims, 15 Drawing Sheets

(56) References Cited

U.S. PATENT DOCUMENTS

| | | |
|---|---|---|
| 2014/0338451 A1 | 11/2014 | Takagi |
| 2015/0007656 A1 | 1/2015 | Weber et al. |
| 2015/0241466 A1 | 8/2015 | Tanaka |
| 2015/0377919 A1 | 12/2015 | Yoda |
| 2016/0254798 A1 | 9/2016 | Takebayashi et al. |
| 2016/0297673 A1 | 10/2016 | Lagouge et al. |

FOREIGN PATENT DOCUMENTS

| | | |
|---|---|---|
| JP | 3474582 B2 | 12/2003 |
| JP | 4590976 B2 | 12/2010 |
| JP | 4665942 B2 | 4/2011 |
| JP | 2013-040856 A | 2/2013 |
| JP | 2013-225574 A | 10/2013 |
| JP | 2014-224739 A | 12/2014 |
| JP | 2015-037828 A | 2/2015 |
| JP | 2015-158452 A | 9/2015 |
| JP | 2016-052083 A | 4/2016 |

\* cited by examiner

VIBRATING DEVICE, VIBRATING DEVICE MODULE, ELECTRONIC APPARATUS, AND VEHICLE

BACKGROUND

1. Technical Field

The present invention relates to a vibrating device, a vibrating device module, an electronic apparatus, and a vehicle.

2. Related Art

An acceleration sensor disclosed in JP-A-2000-275272 includes a glass substrate and a silicon substrate bonded to the upper surface of the glass substrate. The silicon substrate includes a sealing section bonded to the glass substrate, a movable electrode disposed facing and spaced apart from the glass substrate, and a beam connecting the movable electrode with the sealing section such that the movable electrode is displaceable with respect to the glass substrate.

A fixed electrode is provided at a portion facing the movable electrode on the surface of the glass substrate on the side of the silicon substrate. A capacitance is generated between the movable electrode and the fixed electrode. When the movable electrode is displaced with respect to the glass substrate upon the application of acceleration, a gap dimension between the movable electrode and the fixed electrode is changed. In response to this displacement, the capacitance generated between the movable electrode and the fixed electrode changes. Therefore, the acceleration sensor disclosed in JP-A-2000-275272 can detect the applied acceleration based on the change in capacitance.

JP-A-2000-275272 discloses the use of Pyrex glass (registered trademark) as the glass substrate. Therefore, the glass substrate contains mobile ions such as sodium ions ($Na^+$).

However, the mobile ions in the glass substrate migrate due to a voltage applied to the fixed electrode. This risks that the surface of the glass substrate on the side facing the silicon substrate becomes charged. The charging of the surface of the glass substrate on the side facing the silicon substrate can cause electrostatic attraction between the glass substrate and the beam. By this electrostatic attraction, the movable electrode may also be attracted toward the glass substrate together with the beam. Therefore, there is a problem that the movable electrode may be displaced with respect to the glass substrate without the application of acceleration and thus drifting of an output signal from the acceleration sensor can occur.

SUMMARY

An advantage of some aspects of the invention is to provide a vibrating device capable of reducing output drift, a vibrating device module, an electronic apparatus, and a vehicle.

The advantage can be achieved by the following aspects of the invention.

A vibrating device according to an aspect of the invention includes: a base body containing mobile ions; a movable member disposed facing and spaced apart from the base body; and a conductor section disposed so as to cover at least a portion of the movable member, wherein a first voltage whose potential periodically changes based on a reference potential is applied to the movable member, and a second voltage that is at the reference potential when time-averaged is applied to the conductor section.

With this configuration, the migration of mobile ions in the base body is reduced.

Therefore, electrostatic attraction is less likely to occur between the base body and the movable member, which enables the vibrating device to reduce output drift.

In the vibrating device according to the aspect of the invention, it is preferable that the second voltage is constant.

With this configuration, it is easy to generate the second voltage. Moreover, the migration of mobile ions in the base body can be effectively reduced.

In the vibrating device according to the aspect of the invention, it is preferable that the vibrating device further includes an electrode disposed on the base body and disposed facing the movable member, that the movable member is displaceable in a direction in which the base body and the movable member are arranged, and that the electrode outputs an electrical signal in response to the displacement of the movable member.

With this configuration, the vibrating device can be applied as a physical quantity sensor that detects physical quantity such as acceleration or angular velocity. Therefore, the convenience of the vibrating device is improved.

In the vibrating device according to the aspect of the invention, it is preferable that the second voltage is applied to the electrode.

With this configuration, the migration of mobile ions in the base body can be more effectively reduced.

In the vibrating device according to the aspect of the invention, it is preferable that the conductor section includes a conductor layer disposed on the base body on the side opposite to the movable member.

With this configuration, the migration of mobile ions in the base body can be more effectively reduced.

In the vibrating device according to the aspect of the invention, it is preferable that the conductor section includes a lid body bonded to the base body and accommodating the movable member between the base body and the lid body.

With this configuration, the migration of mobile ions in the base body can be more effectively reduced. Moreover, the movable member can be protected by the base body and the lid body.

In the vibrating device according to the aspect of the invention, it is preferable that the conductor section includes an edge section connected to the base body and disposed so as to surround at least a portion of the movable member in a plan view in a direction in which the base body and the movable member are arranged.

With this configuration, the migration of mobile ions in the base body can be more effectively reduced.

A vibrating device module according to an aspect of the invention includes the vibrating device according to the aspect of the invention.

With this configuration, the vibrating device module can have the advantageous effects of the vibrating device according to the aspect of the invention, and the vibrating device module with high reliability is obtained.

In the vibrating device module according to the aspect of the invention, it is preferable that the conductor section includes a conductor layer disposed on the base body on the side opposite to the movable member, and that the vibrating device module further includes an insulating layer disposed between the base body and the conductor layer.

With this configuration, electrostatic attraction is less likely to occur between the base body and the movable member.

In the vibrating device module according to the aspect of the invention, it is preferable that the vibrating device module further includes a support substrate supporting the vibrating device, that the support substrate includes a first insulating layer, and a second insulating layer located on one side of the first insulating layer, and that at least a portion of the conductor section is disposed between the first insulating layer and the second insulating layer.

With this configuration, electrostatic attraction is less likely to occur between the base body and the movable member.

An electronic apparatus according to an aspect of the invention includes the vibrating device according to the aspect of the invention.

With this configuration, the electronic apparatus can have the advantageous effects of the vibrating device according to the aspect of the invention, and the electronic apparatus with high reliability is obtained.

A vehicle according to an aspect of the invention includes the vibrating device according to the aspect of the invention.

With this configuration, the vehicle can have the advantageous effects of the vibrating device according to the aspect of the invention, and the vehicle with high reliability is obtained.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

Hereinafter, a vibrating device, a vibrating device module, an electronic apparatus, and a vehicle according to the invention will be described in detail based on embodiments shown in the accompanying drawings.

First Embodiment

First, a vibrating device according to a first embodiment of the invention will be described.

Figure 1:
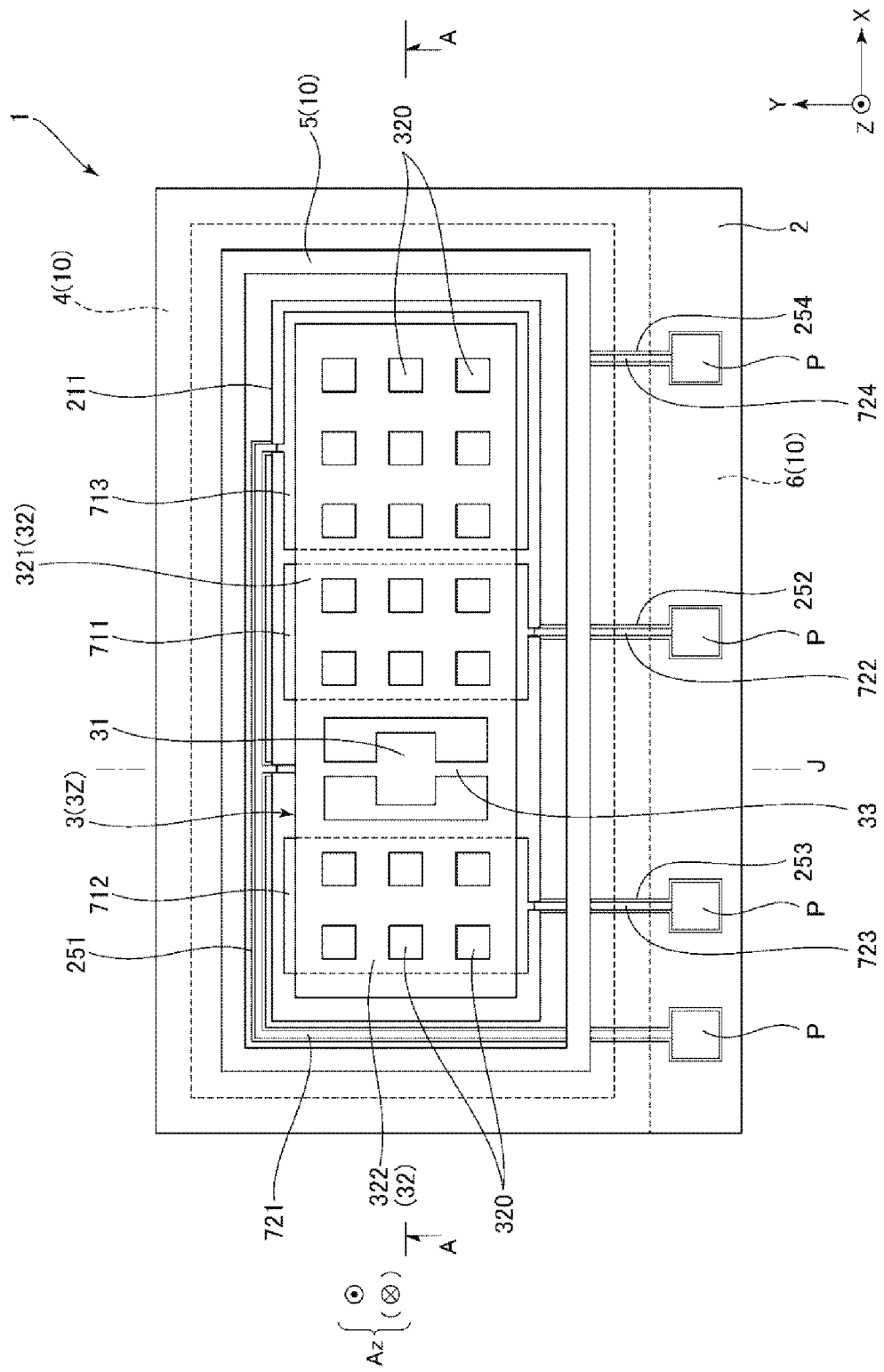
FIG. 1 is a plan view showing a vibrating device according to a first embodiment of the invention.
Figure 2:
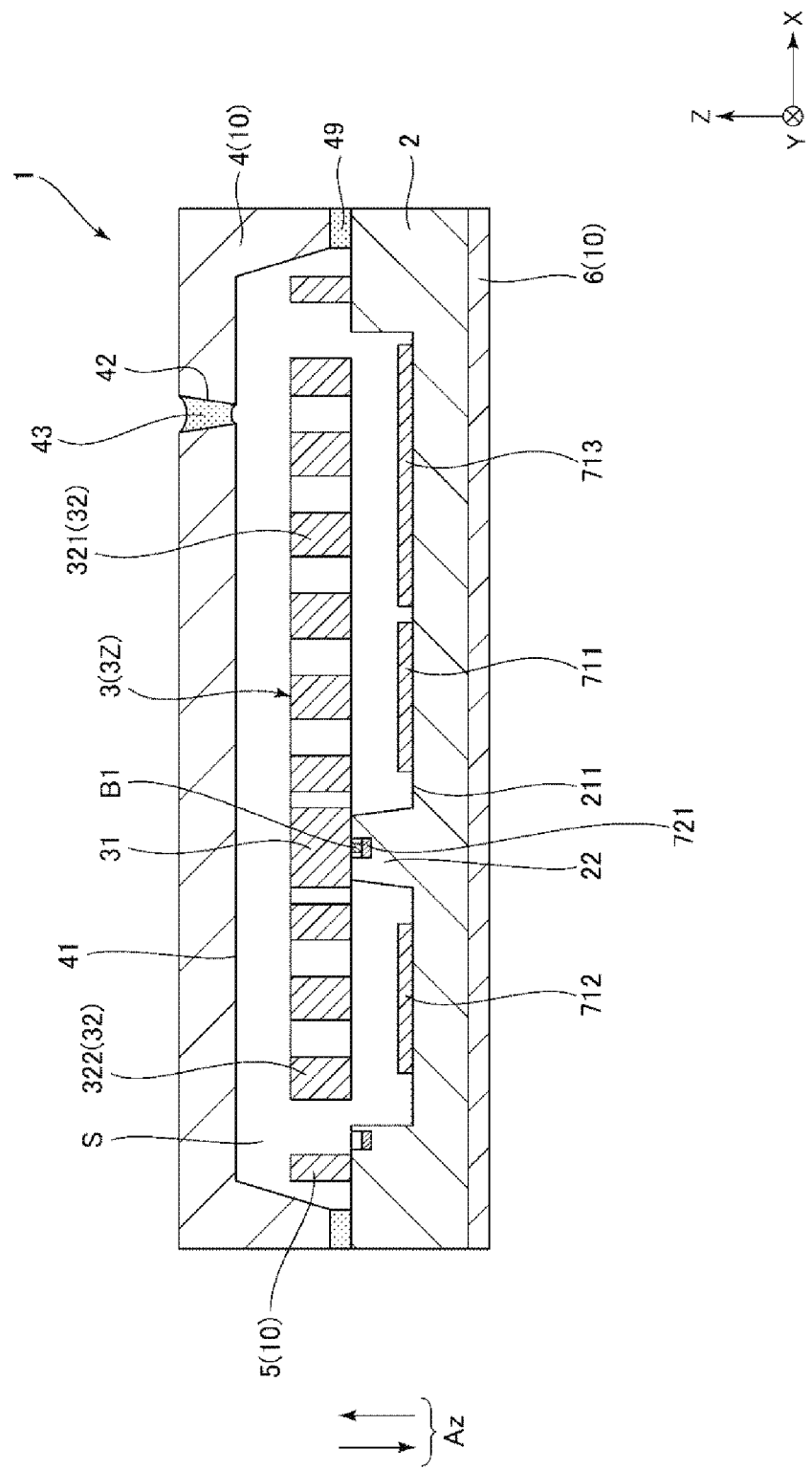
FIG. 2 is a cross-sectional view taken along line A-A in FIG. 1.
Figure 3:
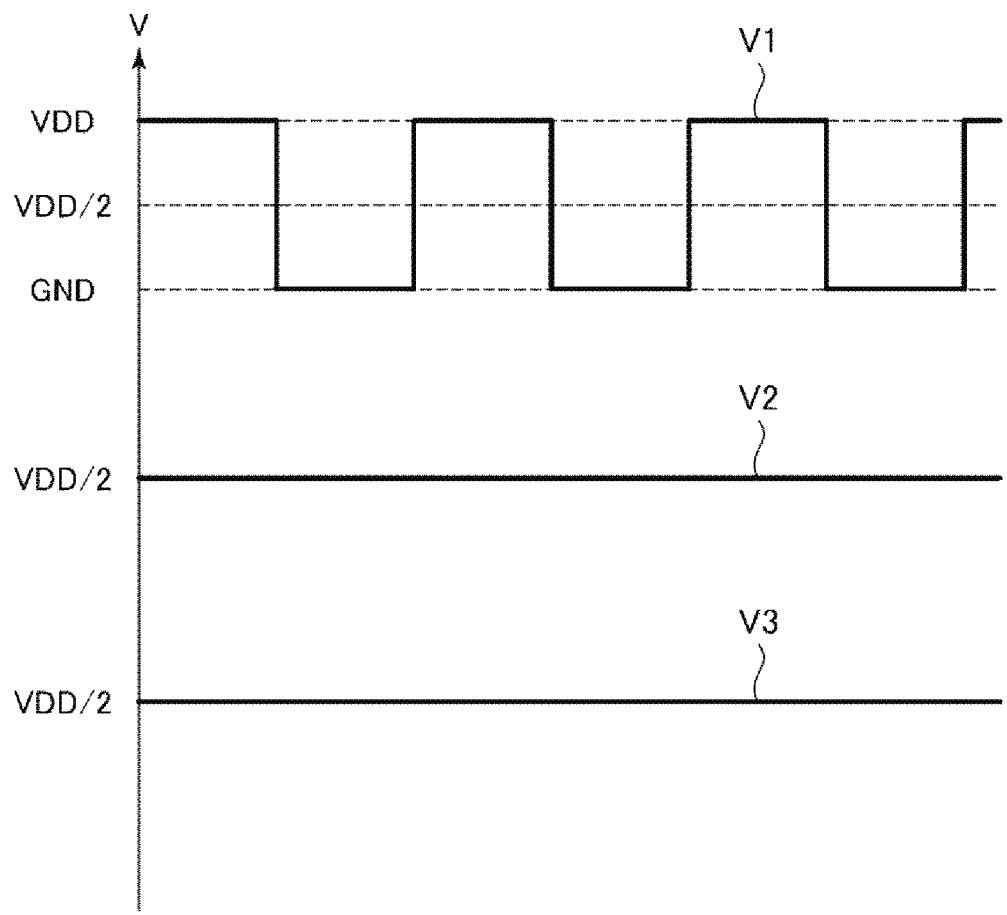
FIG. 3 is a diagram showing voltages applied to the vibrating device.
Figure 4:
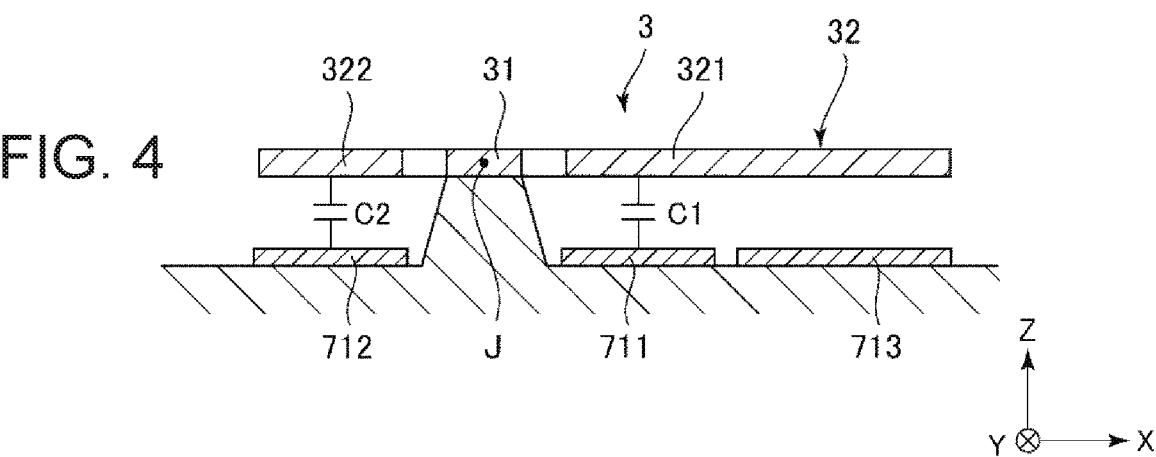
FIG. 4 is a cross-sectional view explaining the operation of the vibrating device shown in FIG. 1.
Figure 5:
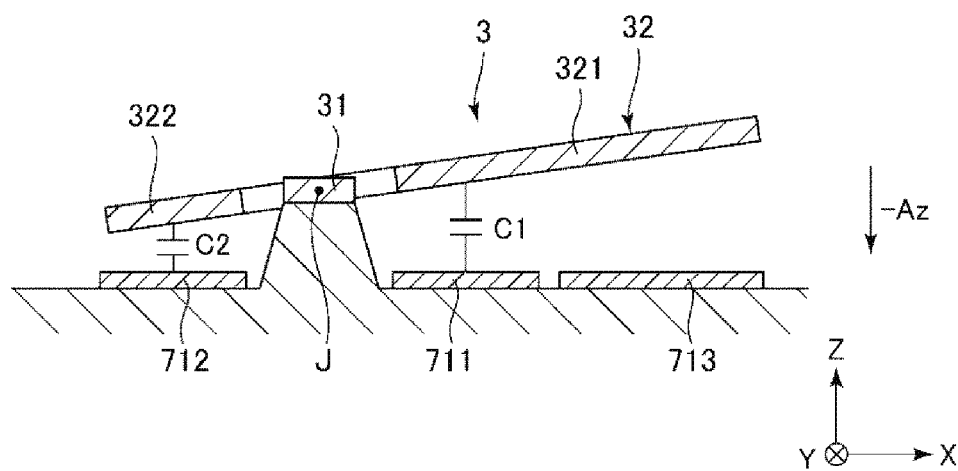
FIG. 5 is a cross-sectional view explaining the operation of the vibrating device shown in FIG. 1.
Figure 6:
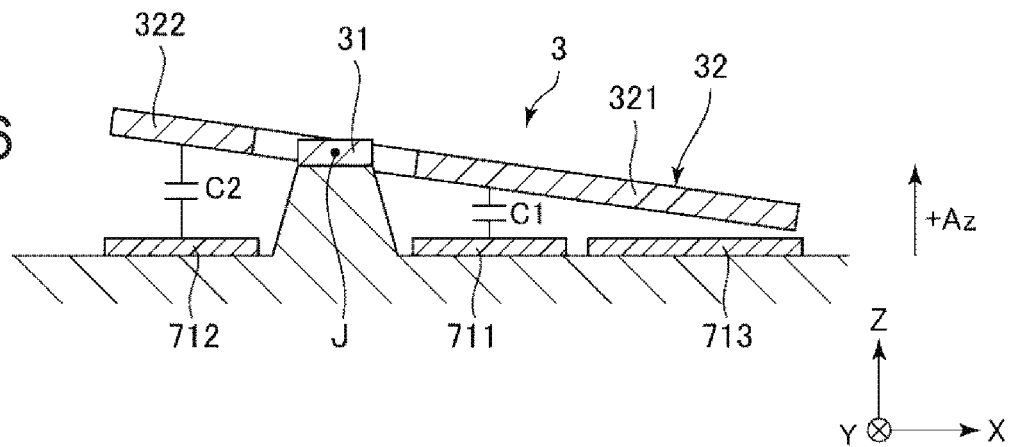
FIG. 6 is a cross-sectional view explaining the operation of the vibrating device shown in FIG. 1.

FIG. 1 is a plan view showing the vibrating device according to the first embodiment of the invention. FIG. 2 is a cross-sectional view taken along line A-A in FIG. 1. FIG. 3 is a diagram showing voltages applied to the vibrating device. FIGS. 4 to 6 are cross-sectional views explaining the operation of the vibrating device shown in FIG. 1. In the following, for convenience of description, the paper surface near side in FIG. 1 and the upper side in FIG. 2 are also referred to as "top", and the paper surface far side in FIG. 1 and the lower side in FIG. 2 are also referred to as "bottom". In the drawings, the X-axis, the Y-axis, and the Z-axis are illustrated as three axes perpendicular to each other. Moreover, in the following, a direction parallel to the X-axis is also referred to as "X-axis direction"; a direction parallel to the Y-axis is also referred to as "Y-axis direction"; and a direction parallel to the Z-axis is also referred to as "Z-axis direction". Moreover, the arrow tip side of each axis is also referred to as "positive side"; and the opposite side is also referred to as "negative side".

The vibrating device 1 shown in FIG. 1 is an acceleration sensor that can measure acceleration Az in the Z-axis direction. As shown in FIG. 1, the vibrating device 1 includes a base body 2 (a base), an element section 3 disposed on the base body 2, a lid body 4 (a lid) bonded to the base body 2 so as to cover the element section 3 (a proof mass), an edge section 5 (an interior frame or perimeter wall) disposed on (upstanding from) the upper surface of the base body 2 and having a frame shape that surrounds the element section 3, and a conductor layer 6 disposed on the lower surface of the base body 2. In the vibrating device 1, the lid body 4, the edge section 5, and the conductor layer 6 have conductivity and constitute a conductor section 10 (or a conductor 10). In other words, the conductor section 10 includes the lid body 4, the edge section 5, and the conductor layer 6.

As shown in FIG. 1, the base body 2 is plate shaped having a rectangular plan-view shape. The base body 2 includes a recess 211 opened on the upper surface side. In a plan view in the Z-axis direction, the recess 211 is formed larger than the element section 3 so as to contain the element section 3 on the inside of the recess 211. The recess 211 functions as a clearance section for preventing (reducing) the contact between the element section 3 and the base body 2. The plan-view shape of the base body 2 is not limited to a rectangle, and may be, for example, a circle, a polygon other than a rectangle, an odd shape, or the like.

As shown in FIG. 2, the base body 2 includes a mount section 22 (a post) protruding (upstanding) from the bottom surface of the recess 211. The element section 3 is bonded to the upper surface of the mount section 22. With this configuration, the element section 3 is supported relative to the base body 2 in the state of being spaced apart from the bottom surface of the recess 211.

As shown in FIG. 1, the base body 2 includes grooves 251, 252, 253, and 254 opened in the upper surface thereof. One end of each of the grooves 251, 252, 253, and 254 is located outside (extends outboard of) the lid body 4.

As the base body 2, for example, a glass substrate made of a glass material (e.g., borosilicate glass such as Tempax glass (registered trademark) or Pyrex glass (registered trademark)) containing mobile ions (alkali metal ions; hereinafter represented by $Na^+$) such as sodium ions ($Na^+$) or lithium ions ($Li^+$) can be used. With this configuration, for example, the base body 2 and the element section 3 can be anodically bonded together and thus can be firmly bonded together as will be described later. Moreover, the base body 2 having a light transmitting property is obtained, and therefore, the state of the element section 3 can be visually recognized from the outside of the vibrating device 1 through the base body 2. It is sufficient that the constituent material of the base body 2 includes mobile ions, and the constituent material is not limited to a glass material.

As shown in FIG. 1, a first detection electrode 711, a second detection electrode 712, and a dummy electrode 713 are disposed spaced apart from each other on the bottom surface of the recess 211. The first detection electrode 711, the second detection electrode 712, and the dummy electrode 713 will be described in more detail later.

Wiring lines 721, 722, 723, and 724 are disposed in the grooves 251, 252, 253, and 254. One end of each of the wiring lines 721, 722, 723, and 724 is exposed to the outside of the lid body 4, and functions as an electrode pad P to perform electrical connection with an external device (a circuit element 8 to be described later). The wiring line 721 runs on the bottom surface of the recess 211 and is routed to the mount section 22, and is electrically connected with the element section 3 through a conductive bump B1 on the mount section 22. Moreover, the wiring line 721 branches off at some midpoint, and is also electrically connected with the dummy electrode 713. The wiring line 722 is electrically connected with the first detection electrode 711. The wiring line 723 is electrically connected with the second detection electrode 712. The wiring line 724 is electrically connected with the edge section 5.

The constituent material of the electrodes 711, 712, and 713 and the wiring lines 721, 722, 723, and 724 is not particularly limited as long as the constituent material has conductivity. For example, examples of the constituent material include metal materials, such as gold (Au), silver (Ag), platinum (Pt), palladium (Pd), iridium (Ir), copper (Cu), aluminum (Al), nickel (Ni), titanium (Ti), and tungsten (W), alloys containing these metal materials, and oxide-based transparent conductive materials such as indium tin oxide (ITO), indium zinc oxide (IZO), ZnO, and IGZO. One kind of these materials, or two or more kinds of these materials in combination (e.g., as a stacked body of two or more layers), can be used.

As shown in FIG. 2, the conductor layer 6 is disposed on the lower surface of the base body 2. The conductor layer 6 is disposed over substantially the entire area of the lower surface of the base body 2. That is, the entire area of the lower surface of the base body 2 is covered by the conductor layer 6. However, the arrangement of the conductor layer 6 is not particularly limited, and, for example, the conductor layer 6 may be disposed on a portion of the lower surface of the base body 2.

As shown in FIG. 1, the lid body 4 is plate shaped having a rectangular plan-view shape. As shown in FIG. 2, the lid body 4 includes a recess 41 opened on the lower surface side (the base body 2 side). The lid body 4 is bonded to the upper surface of the base body 2 so as to accommodate the element section 3 and the edge section 5 in the recess 41. The lid body 4 and the base body 2 form, on the inside thereof, an accommodating space S for accommodating the element section 3 and the edge section 5.

Moreover, as shown in FIG. 2, the lid body 4 includes a communication hole 42 openly communicating between the interior and exterior of the accommodating space S. The atmosphere of the accommodating space S can be replaced with a desired atmosphere through the communication hole 42. A sealing member 43 is disposed in the communication hole 42. The communication hole 42 is airtightly sealed by the sealing member 43.

The sealing member 43 is not particularly limited as long as the communication hole 42 can be sealed. For example, various alloys such as a gold (Au)/tin (Sn)-based alloy, a gold (Au)/germanium (Ge)-based alloy, and a gold (Au)/aluminum (Al)-based alloy, a glass material such as a low-melting-point glass, and the like can be used.

The accommodating space S is an airtight space. It is preferable that the accommodating space S is at a substantially atmospheric pressure, with an inert gas such as nitrogen, helium, or argon enclosed therein, at an operating temperature (approximately −40° C. to +120° C.). By setting the accommodating space S at an atmospheric pressure, a damping effect is exhibited with increased viscosity resistance, and thus the vibration of the element section 3 can be rapidly settled. Therefore, detection accuracy of the vibrating device 1 for the acceleration Az is improved.

As the lid body 4, for example, a silicon substrate can be used. In particular, it is preferable to use a silicon substrate doped with an impurity such as phosphorus (P) or boron (B) and having conductivity. However, the lid body 4 is not particularly limited, and, for example, a glass substrate or a ceramic substrate may be used. A method of bonding the base body 2 with the lid body 4 is not particularly limited, and may be appropriately selected depending on the materials of the base body 2 and the lid body 4. For example, examples of the bonding method include anodic bonding, activated bonding in which bonding surfaces activated by plasma irradiation are bonded together, bonding using a bonding material such as a glass frit, and diffusion bonding in which metal films deposited on the upper surface of the base body 2 and the lower surfaces of the lid body 4 are bonded together.

In the embodiment, as shown in FIG. 2, the base body 2 and the lid body 4 are bonded together with a glass frit 49 (low-melting-point glass) as one example of bonding materials. In the state where the base body 2 and the lid body 4 are laid on top of each other, the interior and exterior of the accommodating space S communicate with each other through the grooves 251, 252, 253, and 254; however, using the glass frit 49 enables the base body 2 and the lid body 4 to be bonded together and at the same time enables the grooves 251, 252, 253, and 254 to be sealed. Therefore, the accommodating space S can be airtightly sealed more easily. When the base body 2 and the lid body 4 are bonded by anodic bonding or the like (a bonding method in which the grooves 251, 252, 253, and 254 cannot be sealed), the grooves 251, 252, 253, and 254 can be closed by, for example, a $SiO_2$ film formed by a CVD method or the like using tetraethoxysilane (TEOS).

As shown in FIG. 1, the element section 3 is configured of a first element section 3Z that can detect the acceleration Az in the Z-axis direction. The first element section 3Z includes a fixed section 31 (anchor) bonded to the mount section 22, a movable member 32 (proof mass) displaceable with respect to the fixed section 31, and a beam section 33 (flexure or torsion beam) connecting the fixed section 31 with the movable member 32. The movable member 32 can rock (pivot) in a seesaw manner with respect to the fixed section 31 about the beam section 33 serving as a rocking axis J while torsionally deforming the beam section 33.

The element section 3 can be formed by, for example, patterning a silicon substrate doped with an impurity such as phosphorus (P) or boron (B). The element section 3 is bonded to the mount section 22 by, for example, anodic bonding. However, the material of the element section 3 and the bonding method of the element section 3 to the base body 2 are not particularly limited.

The movable member 32 is longitudinally extended in the X-direction. A portion of the movable member 32 that is located on the X-axis-direction positive side (one side) with respect to the rocking axis J is a first movable member 321 (first movable platform), and a portion of the movable member 32 that is located on the X-axis-direction negative side (the other side) with respect to the rocking axis J is a second movable member 322 (second movable platform). The first movable member 321 is longer in the X-axis direction than the second movable member 322, and the rotation moment (torque) of the first movable member 321 when the acceleration Az is applied is larger than that of the second movable member 322. Due to this difference in rotation moment, the movable member 32 rocks, when the acceleration Az is applied, in a seesaw manner about the rocking axis J in response to the direction and magnitude of the acceleration Az.

A plurality of through-holes 320 are formed in the movable member 32 to reduce resistance during rocking in a seesaw manner. However, the through-holes 320 may be formed as desired, and may be omitted. Moreover, the shape or arrangement of the through-holes 320 is not particularly limited.

As shown in FIG. 2, the first detection electrode 711, the second detection electrode 712, and the dummy electrode 713 described above are provided facing the first element section 3Z described above. Specifically, the first detection electrode 711 is disposed facing a base end portion of the first movable member 321. The second detection electrode 712 is disposed facing a proximal face of the second movable member 322. The dummy electrode 713 is disposed facing a tip end portion (a distal face) of the first movable member 321.

During the operation of the vibrating device 1, for example, a voltage V1 (first voltage) in FIG. 3 is applied to the movable member 32, and a voltage V2 (second voltage) in FIG. 3 is applied to each of the first detection electrode 711 and the second detection electrode 712. The voltage V1 is a voltage whose potential periodically changes between VDD and GND (0V) based on a reference potential VDD/2. Therefore, the voltage V1 is a voltage that is at VDD/2 when time-averaged. On the other hand, the voltage V2 is a constant voltage whose potential is VDD/2 (i.e., the reference potential of the voltage V1). With this configuration, a capacitance C1 is formed between the first movable member 321 and the first detection electrode 711, and a capacitance C2 is formed between the second movable member 322 and the second detection electrode 712. The reference potential VDD/2 is not particularly limited but may be, for example, approximately 0.5V or more and 5V or less.

Note that technically unavoidable potential fluctuations or the like may occur in the voltages V1 and V2. Moreover, for example, the voltage V2 may not be constant as long as the potential thereof is VDD/2 when time-averaged, and, for example, the potential may periodically change. In the embodiment, the voltage V1 has a rectangular wave; however, the voltage V1 is not limited to this, and may have, for example, a sine wave or a sawtooth wave.

As shown in FIG. 4, when the acceleration Az is not applied to the vibrating device 1, neither of the capacitances C1 and C2 change because the movable member 32 maintains its substantially parallel state relative to the base body 2 and does not rock. In contrast, as shown in FIG. 5, when acceleration -Az to the Z-axis-direction negative side is applied to the vibrating device 1, the movable member 32 rocks counterclockwise in a seesaw manner about the rocking axis J because of the difference in rotation moment between the first and second movable members 321 and 322. Conversely, as shown in FIG. 6, when acceleration +Az to the Z-axis-direction positive side is applied to the vibrating device 1, the movable member 32 rocks clockwise in a seesaw manner about the rocking axis J. Due to the rocking of the movable member 32 in a seesaw manner described above, the gap between the first movable member 321 and the first detection electrode 711 and the gap between the second movable member 322 and the second detection electrode 712 changes. In response to the changes, each of the capacitances C1 and C2 changes. Then, detection signals (electrical signals) based on the changes in the capacitances C1 and C2 are output from the first and second detection electrodes 711 and 712, and the acceleration Az can be detected based on the detection signals (electrical signals).

As described above, the dummy electrode 713 is electrically connected with the movable member 32 through the wiring line 721, and is at the same potential as the movable member 32. The dummy electrode 713 has, for example, the following functions. When an electric field acts on the base body 2 with the voltage V1 applied to the movable member 32 and the mobile ions (Na$^+$) in the base body 2 migrate, the bottom surface of the recess 211 becomes charged and the surface potential at the bottom surface of the recess 211 changes. This causes electrostatic attraction between the bottom surface (a portion exposed from the electrodes) of the recess 211 and the movable member 32. Then, the first movable member 321 is attracted to the base body 2 by the electrostatic attraction, and the movable member 32 may rock or tilt (is inclined) without the application of the acceleration Az. As a result, output drift occurs. Moreover, "sticking" occurs in which the first movable member 321 attracted to the base body 2 by the electrostatic attraction sticks to the bottom surface, and thus the vibrating device 1 may fail to function as an acceleration sensor. Therefore, by disposing the dummy electrode 713, which is at the same potential as the movable member 32, in a position facing the movable member 32 on the bottom surface of the recess 211, the influence of charging of the bottom surface of the recess 211 is reduced, and the problem described above is less likely to occur.

During the operation of the vibrating device 1, a voltage V3 in FIG. 3 is applied to the conductor layer 6. The voltage V3 is a voltage whose potential is constant at VDD/2 (i.e., the reference potential of the voltage V1). With this configuration, the conductor layer 6 exhibits a shielding effect that blocks or reduces the leakage of signals detected by the vibrating device 1, or external noise on the vibrating device 1. Therefore, the vibrating device 1 can accurately detect the acceleration Az.

The potential of the voltage V3 is equal to the reference potential of the voltage V1 applied to the movable member 32. Therefore, the migration of mobile ions (Na$^+$) therebetween is reduced, which reduces a change in surface potential caused by the charging of the portion (hereinafter also referred to as "exposed section") of the bottom surface of the recess 211 exposed from the electrodes 711, 712, and 713. Hence, electrostatic attraction does not substantially occur between the exposed section (particularly the area between the first detection electrode 711 and the dummy electrode 713) of the recess 211 and the movable member 32, which can reduce the rocking of the movable member 32 caused without the application of the acceleration Az as described above. Therefore, according to the vibrating device 1, output drift can be reduced, and the acceleration Az can be accurately detected.

While the voltage V3 is constant at VDD/2, the potential of the voltage V1 periodically changes based on VDD/2. Therefore, electric fields that are different in direction alternately act between the movable member 32 and the conductor layer 6. However, the frequency of the voltage V1 is sufficiently high, and the electric fields alternately act at time intervals sufficiently fast relative to the migration speed of mobile ions (Na$^+$); therefore, a potential difference does not substantially occur between the movable member 32 and the conductor layer 6, which reduces the migration of mobile ions (Na$^+$). The frequency of the voltage V1 is not particularly limited but is preferably, for example, 10 kHz or more and 100 kHz or less. With this configuration, the advantageous effect described above is made more remarkable.

The voltage V3 is the same voltage as the voltage V2 applied to the first and second detection electrodes 711 and 712. Therefore, the first and second detection electrodes 711 and 712 and the conductor layer 6, which are disposed to interpose the base body 2 therebetween, are at the same potential, and thus an electric field does not occur therebetween. Hence, the migration of mobile ions (Na$^+$) in the base body 2 is reduced. This reduces the charging of the bottom surface of the recess 211, which can effectively reduce the rocking of the movable member 32 in the state where the acceleration Az is not applied. Therefore, according to the vibrating device 1, output drift can be reduced, and the acceleration Az can be accurately detected.

Figure 11:
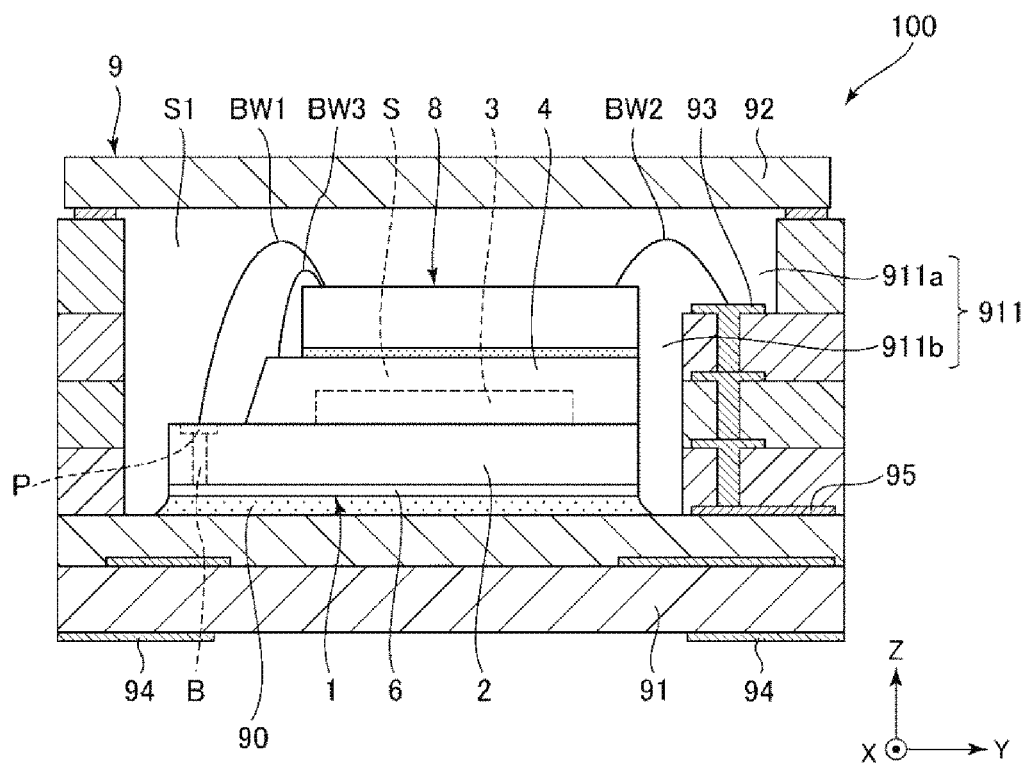
FIG. 11 is a cross-sectional view showing a vibrating device module according to a fourth embodiment of the invention.

Here, the voltage V3 is at the same potential as the voltage V2; therefore, for example, the conductor layer 6 and the electrode pad P of at least one of the wiring lines 722 and 723 may be connected through a via B (through-electrode) penetrating the base body 2 (e.g., see FIG. 11). With this configuration, by applying the voltage V2 to the wiring lines 722 and 723, the voltage V3 can be applied also to the conductor layer 6.

As shown in FIGS. 1 and 2, the edge section 5 is bonded to the upper surface of the base body 2. The edge section 5 is frame shaped in a plan view as viewed in the Z-axis direction, and is disposed so as to surround the element section 3. During the operation of the vibrating device 1, the voltage V3 in FIG. 3 is applied to the edge section 5, similarly to the conductor layer 6. The voltage V3 is a voltage whose potential is constant at VDD/2. With this configuration, the edge section 5 exhibits a shielding effect that blocks or reduces the leakage of signals detected by the vibrating device 1, or external noise on the vibrating device 1. Therefore, the vibrating device 1 can accurately detect the acceleration Az.

Moreover, the voltage V3 is the same voltage as the voltage V2 applied to the first and second detection electrodes 711 and 712. Therefore, the edge section 5 and the first and second detection electrodes 711 and 712 are at the same potential, which reduces the migration of mobile ions (Na$^+$) in the base body 2 located therebetween. Hence, the charging of the exposed section of the recess 211 is reduced, which can reduce the rocking (inclination) of the movable member 32 in the state where the acceleration Az is not applied. Therefore, the vibrating device 1 can reduce output drift and accurately detect the acceleration Az.

The edge section 5 can be formed collectively with the element section 3. For example, a silicon substrate doped with an impurity such as phosphorus (P) or boron (B) is first prepared, and the silicon substrate is bonded to the upper surface of the base body 2. Next, the silicon substrate is reduced, as needed, to a predetermined thickness by chemical mechanical polishing (CMP) or the like. Next, a mask corresponding to the shapes of the element section 3 and the edge section 5 is deposited on the upper surface of the silicon substrate, and the silicon substrate is etched (particularly dry-etched) through the mask. With this configuration, the element section 3 and the edge section 5 can be collectively formed from the silicon substrate.

The shape of the edge section 5 is not particularly limited. It is sufficient that the edge section 5 is disposed so as to surround at least a portion of the element section 3 in the plan view as viewed in the Z-axis direction, and, for example, a portion of the frame shape may be removed. Moreover, the edge section 5 may be omitted.

During the operation of the vibrating device 1, the voltage V3 in FIG. 3 is applied to the lid body 4, similarly to the conductor layer 6 and the edge section 5. The voltage V3 is a voltage whose potential is constant at VDD/2. With this configuration, the lid body 4 exhibits a shielding effect that blocks or reduces the leakage of signals detected by the vibrating device 1, or external noise on the vibrating device 1. Therefore, the vibrating device 1 can accurately detect the acceleration Az.

In particular, the voltage V3 is a voltage that is applied also to the conductor layer 6 and the edge section 5. Therefore, the lid body 4, the conductor layer 6, and the edge section 5 are at the same potential as each other, and thus an electric field caused by a potential difference therebetween does not act on the base body 2, which reduces the migration of mobile ions (Na$^+$) in the base body 2. As a result, the charging of the exposed section of the recess 211 is reduced, which can reduce the rocking (inclination) of the movable member 32 in the state where the acceleration Az is not applied. Therefore, the vibrating device 1 can reduce output drift and accurately detect the acceleration Az.

The vibrating device 1 of the embodiment has been described above. The vibrating device 1 includes the base body 2 containing mobile ions (Na$^+$), the movable member 32 disposed facing and spaced apart from the base body 2, and the conductor section 10 disposed so as to cover at least a portion of the movable member 32. In addition, the voltage V1 (first voltage) whose potential periodically changes based on the reference potential VDD/2 is applied to the movable member 32, and the voltage V3 (second voltage) at the reference potential VDD/2 when time-averaged is applied to the conductor section 10. With this configuration, the migration of mobile ions (Na$^+$) in the base body 2 is reduced, which reduces a change in surface potential due to the charging of the exposed section of the recess 211. Hence, electrostatic attraction does not substantially occur between the exposed section of the recess 211 and the movable member 32. This can reduce the rocking of the movable member 32 in the state where the acceleration Az is not applied. Therefore, according to the vibrating device 1, output drift can be reduced, and the acceleration Az can be accurately detected.

Moreover, as described above, the voltage V3 is constant in the vibrating device 1. That is, the voltage V3 is constant at the reference potential VDD/2. With this configuration, it is easy to generate the voltage V3.

Moreover, as described above, the vibrating device 1 includes the first and second detection electrodes 711 and 712 (electrodes) disposed on the base body 2 and facing the movable member 32. The movable member 32 is displaceable in the Z-axis direction (the direction in which the base body 2 and the movable member 32 are arranged relative to one another), and the first and second detection electrodes 711 and 712 are configured so as to output detection signals (electrical signals) in response to the displacement of the movable member 32. With this configuration, the vibrating device 1 can be applied to an acceleration sensor (physical quantity sensor) that detects the acceleration Az in the Z-axis direction, and thus the convenience of the vibrating device 1 is improved.

Moreover, as described above, the voltage V2 (the same voltage as the second voltage) is applied to the first and second detection electrodes 711 and 712 (electrodes) in the vibrating device 1. With this configuration, the migration of mobile ions ($Na^+$) in the base body 2 can be effectively reduced. Hence, electrostatic attraction does not substantially occur between the exposed section of the recess 211 and the movable member 32, which can reduce the rocking of the movable member 32 in the state where the acceleration Az is not applied. Therefore, according to the vibrating device 1, output drift can be reduced, and the acceleration Az can be accurately detected.

Moreover, as described above, the conductor section 10 includes the conductor layer 6 disposed on the base body 2 on the side opposite to the movable member 32 in the vibrating device 1. With this configuration, the base body 2 is disposed between the first and second detection electrodes 711 and 712 to which the voltage V2 is applied and the conductor layer 6 to which the voltage V3, which is the same voltage as the voltage V2, is applied; therefore, the migration of mobile ions in the base body 2 can be effectively reduced. In particular, the potential of the voltage V3 is constant in the embodiment. Therefore, the conductor layer 6 exhibits the shielding effect that blocks or reduces the leakage of signals detected by the vibrating device 1, or external noise on the vibrating device 1. Therefore, the vibrating device 1 can accurately detect the acceleration Az.

Moreover, as described above, the conductor section 10 includes the lid body 4 bonded to the base body 2 and accommodating the movable member 32 between the base body 2 and the lid body 4 in the vibrating device 1. With this configuration, the migration of mobile ions in the base body 2 can be effectively reduced. In particular, the potential of the voltage V3 is constant in the embodiment; therefore, the lid body 4 exhibits the shielding effect that blocks or reduces the leakage of signals detected by the vibrating device 1, or external noise on the vibrating device 1. Therefore, the vibrating device 1 can accurately detect the acceleration Az.

Moreover, as described above, in the vibrating device 1, the conductor section 10 includes the edge section 5 connected to the base body 2 and disposed so as to surround at least a portion of the movable member 32 in the plan view as viewed in the Z-axis direction (the direction in which the base body 2 and the movable member 32 are arranged). With this configuration, the migration of mobile ions in the base body 2 can be effectively reduced. In particular, the potential of the voltage V3 is constant in the embodiment; therefore, the edge section 5 exhibits the shielding effect that blocks or reduces the leakage of signals detected by the vibrating device 1, or external noise on the vibrating device 1. Therefore, the vibrating device 1 can accurately detect the acceleration Az.

Second Embodiment

Next, a vibrating device according to a second embodiment of the invention will be described.

Figure 7:
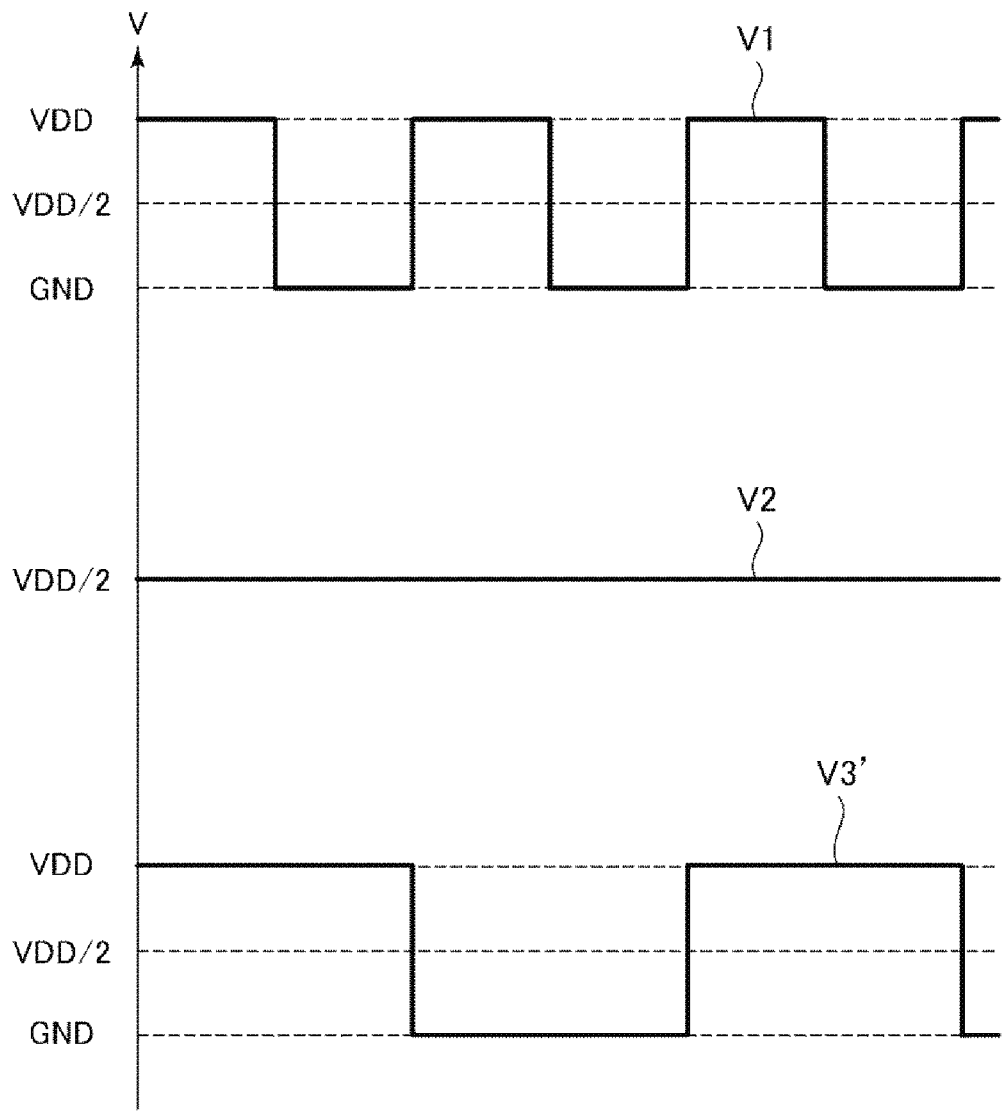
FIG. 7 is a diagram showing voltages applied to a vibrating device according to a second embodiment of the invention.

FIG. 7 is a diagram showing voltages applied to the vibrating device according to the second embodiment of the invention.

The vibrating device according to the embodiment is similar to the vibrating device 1 according to the first embodiment described above except, mainly, that the voltage V3 applied to the lid body 4, the conductor layer 6, and the edge section 5 is different.

In the following description, the vibrating device 1 of the second embodiment will be described focusing on differences from the first embodiment described above, and the description of similar matters is omitted. In FIG. 7, configurations similar to those of the embodiment described above are denoted by the same reference numerals and signs.

A voltage V3' applied to the lid body 4, the conductor layer 6, and the edge section 5 is a voltage whose potential periodically changes between VDD and GND based on VDD/2 as shown in FIG. 7. Moreover, the voltage V3' is at a potential of VDD/2 when time-averaged. Also with the voltage V3', the migration of mobile ions ($Na^+$) in the base body 2 can be reduced. The amplitude of the voltage V3' is not particularly limited, and may have the same amplitude as that of the voltage V1 as in the embodiment, or may have, for example, an amplitude smaller than that.

In the embodiment, the voltage V3' has a frequency that is different from that of the voltage V1. Here, in particular, it is preferable that the voltage V3' has the following frequency relationship, and the same phase, as the voltage V1: V3'=(1/any even number)*V1. With this configuration, a potential difference does not substantially occur between the movable member 32 and each of the lid body 4, the conductor layer 6 and the edge section 5; therefore, the migration of mobile ions ($Na^+$) in the base body 2 can be effectively reduced. Moreover, by setting the voltage V3' to be the same as the voltage V1, it is easy to generate the voltage V3'.

The second embodiment also can exhibit advantageous effects similar to those of the first embodiment described above. In the embodiment, the voltage V3' is applied to all of the lid body 4, the conductor layer 6, and the edge section 5; however, for example, the voltage V3 described in the first embodiment described above may be applied to any one or two of the lid body 4, the conductor layer 6 and the edge section 5. This also can exhibit similar advantageous effects.

Third Embodiment

Next, a vibrating device according to a third embodiment of the invention will be described.

Figure 8:
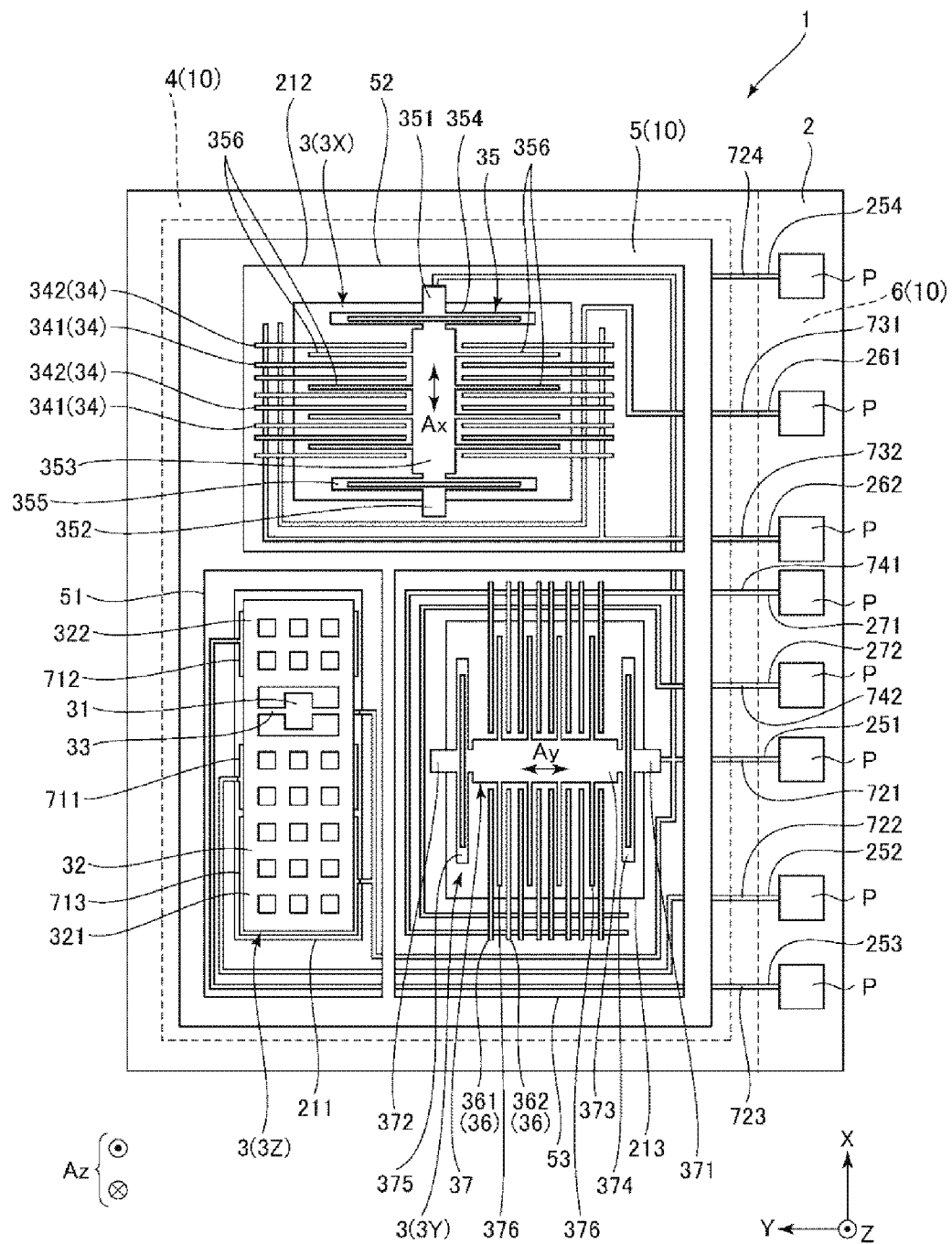
FIG. 8 is a plan view showing a vibrating device according to a third embodiment of the invention.
Figure 9:
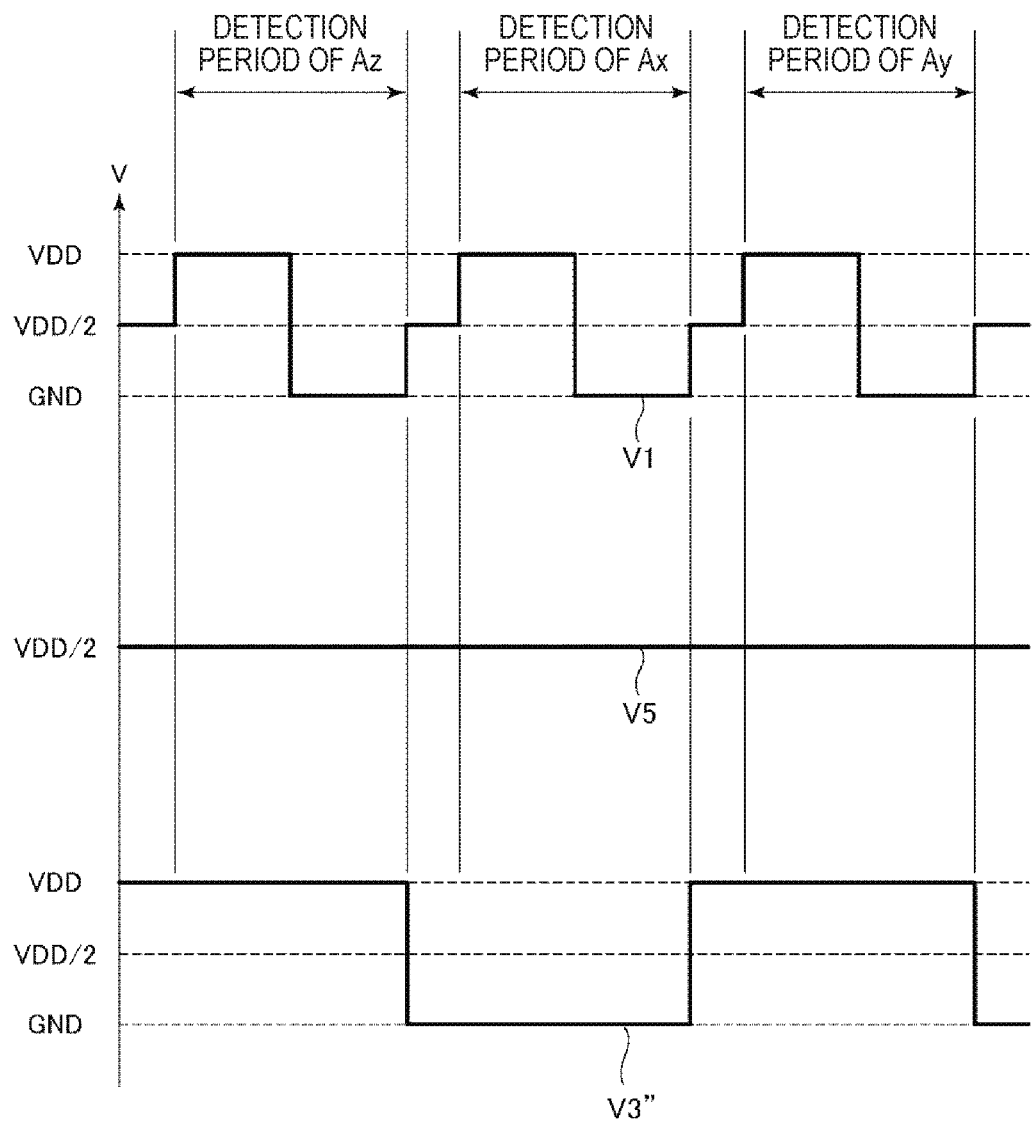
FIG. 9 is a diagram showing voltages applied to the vibrating device shown in FIG. 8.
Figure 10:
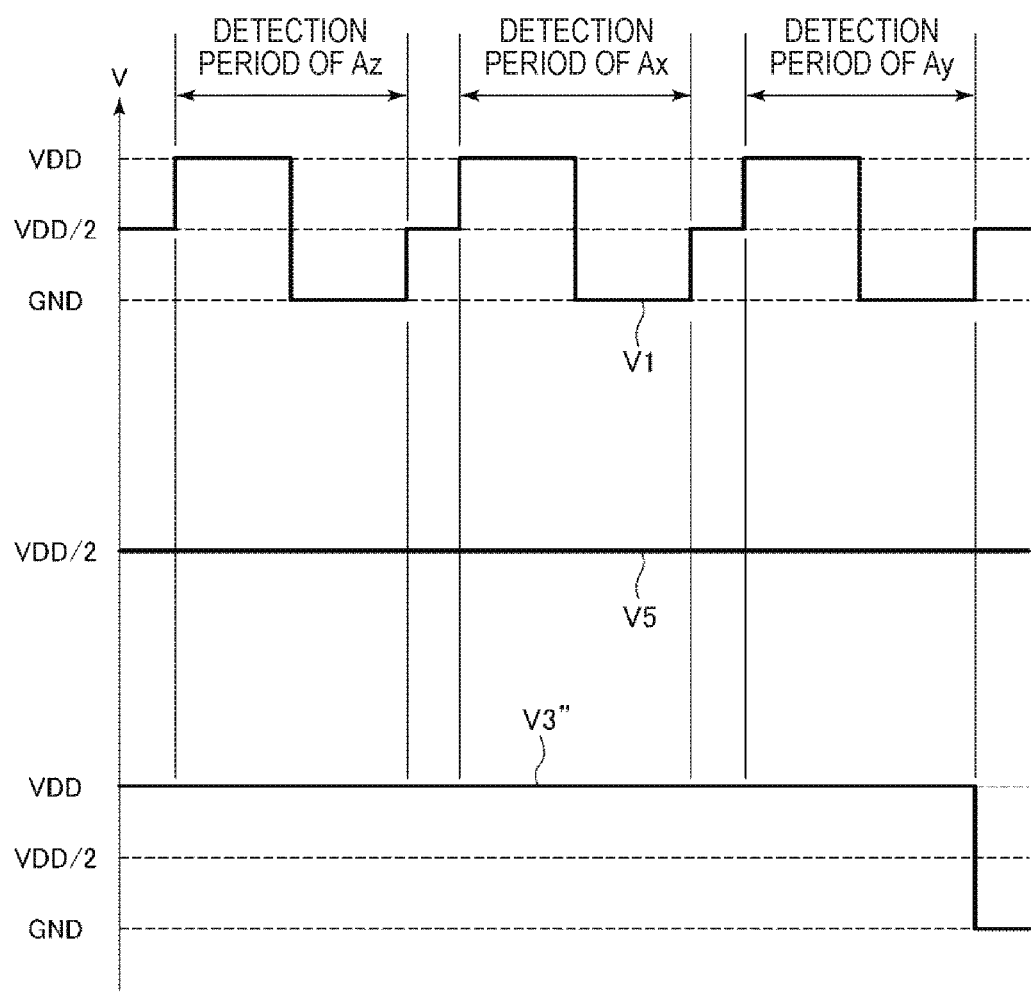
FIG. 10 is a diagram showing voltages applied to the vibrating device shown in FIG. 8.

FIG. 8 is a plan view showing the vibrating device according to the third embodiment of the invention. FIGS. 9 and 10 are diagrams showing voltages applied to the vibrating device shown in FIG. 8.

The vibrating device according to the embodiment is similar to the vibrating device 1 according to the first embodiment described above except, mainly, that the configuration of the element section 3 is different.

In the following description, the vibrating device 1 of the third embodiment will be described focusing on differences from the first embodiment described above, and the description of similar matters is omitted. In FIG. 8, configurations similar to those of the embodiments described above are denoted by the same reference numerals and signs.

The element section 3 includes the first element section 3Z that detects the acceleration Az in the Z-axis direction, a second element section 3X that detects acceleration Ax in the X-axis direction, and a third element section 3Y that detects acceleration Ay in the Y-axis direction. The first element section 3Z is configured similarly to the first element section 3Z of the first embodiment described above.

The recess 211 overlapping the first element section 3Z, a recess 212 overlapping the second element section 3X, and a recess 213 overlapping the third element section 3Y are formed in the base body 2. Moreover, grooves 251, 252, 253, 254, 261, 262, 271, and 272 opened on the upper surface are formed in the base body 2. Wiring lines 721, 722, 723, 724, 731, 732, 741, and 742 are provided in the grooves 251, 252, 253, 254, 261, 262, 271, and 272. The wiring lines 731 and 732 are wiring lines for the second element section 3X, and the wiring lines 741 and 742 are wiring lines for the third element section 3Y.

The second element section 3X includes a fixed electrode section 34 fixed to the base body 2, and a movable electrode section 35 displaceable with respect to the base body 2. The second element section 3X can be formed by patterning a silicon substrate doped with an impurity such as phosphorus (P) or boron (B), similarly to the first element section 3Z.

The movable electrode section 35 includes a pair of support sections 351 and 352, a movable member 353, a pair of coupling sections 354 and 355, and movable electrode fingers 356. The support sections 351 and 352 are disposed so as to face each other in the X-axis direction with the recess 212 therebetween, and are each bonded to the upper surface of the base body 2. The support section 351 is electrically connected with the wiring line 721 through a not-shown conductive bump (conductive member).

The movable member 353 is located between the support sections 351 and 352. Moreover, the movable member 353 is coupled, at an end on the X-axis-direction negative side, to the support section 351 through the coupling section 354, and coupled, at an end on the X-axis-direction positive side, to the support section 352 through the coupling section 355. The coupling sections 354 and 355 are each elastically deformable in the X-axis direction. When the acceleration Ax is applied, the movable member 353 is displaced in the X-axis direction with respect to the support sections 351 and 352 while elastically deforming the coupling sections 354 and 355. The movable member 353 is provided with the plurality of movable electrode fingers 356 extending in the Y-axis direction on both sides of the movable member 353 and arranged in parallel and spaced apart from each other in the X-axis direction.

The fixed electrode section 34 includes a plurality of first fixed electrode fingers 341 and a plurality of second fixed electrode fingers 342. The plurality of first fixed electrode fingers 341 are disposed on the X-axis-direction positive side of the movable electrode fingers 356, and are arranged so as to form a comb-teeth shape in which each of the first fixed electrode finger 341 engages with the corresponding movable electrode finger 356 with a space therebetween. On the other hand, the plurality of second fixed electrode fingers 342 are disposed on the X-axis-direction negative side of the movable electrode fingers 356, and are arranged so as to form a comb-teeth shape in which each of the second fixed electrode finger 342 engages with the corresponding movable electrode finger 356 with a space therebetween. The first fixed electrode finger 341 and the second fixed electrode finger 342 are bonded, at the base ends thereof, to the upper surface of the base body 2.

Each of the first fixed electrode fingers 341 is electrically connected with the wiring line 731 through a not-shown conductive bump. Each of the second fixed electrode fingers 342 is electrically connected with the wiring line 732 through a not-shown conductive bump.

Next, the operation of the second element section 3X will be described. During the operation of the vibrating device 1, for example, the voltage V1 in FIG. 9 is applied to the movable electrode section 35, and a voltage V5 is applied to the first fixed electrode finger 341 and the second fixed electrode finger 342. Then, when the acceleration Ax in the X-axis direction is applied to the vibrating device 1, the movable member 353 is displaced in the X-axis direction based on the magnitude of the acceleration Ax while elastically deforming the coupling sections 354 and 355. With such displacement, the gap between the movable electrode finger 356 and the first fixed electrode finger 341 and the gap between the movable electrode finger 356 and the second fixed electrode finger 342 each change, and in response to the amount of change, the magnitudes of the capacitance between the movable electrode finger 356 and the first fixed electrode finger 341 and the capacitance between the movable electrode finger 356 and the second fixed electrode finger 342 each change. Then, detection signals (electrical signals) based on the changes in capacitance are output from the first and second fixed electrode fingers 341 and 342, and the acceleration Ax can be detected based on the detection signals (electrical signals).

As shown in FIG. 8, the third element section 3Y includes a fixed electrode section 36 fixed to the base body 2, and a movable electrode section 37 displaceable with respect to the base body 2. The movable electrode section 37 includes a pair of support sections 371 and 372, a movable member 373, a pair of coupling sections 374 and 375, and a plurality of movable electrode fingers 376. The fixed electrode section 36 includes a plurality of fixed electrode fingers 361 and a plurality of fixed electrode fingers 362. The third element section 3Y can be formed by patterning a silicon substrate doped with an impurity such as phosphorus (P) or boron (B), similarly to the first element section 3Z. The third element section 3Y is configured similarly to the second element section 3X described above except that the orientation of the third element section 3Y is rotated by 90° about the Z-axis. Therefore, the detailed description of the third element section 3Y is omitted.

The edge section 5 includes three openings 51, 52, and 53. The first element section 3Z is located inside the opening 51. The second element section 3X is located inside the opening 52. The third element section 3Y is located inside the opening 53.

In the vibrating device 1 configured as described above, the detection of the acceleration Az by the first element section 3Z, the detection of the acceleration Ax by the second element section 3X, and the detection of the acceleration Ay by the third element section 3Y are performed in a time-division manner, as shown in FIG. 9, using, for example, a multiplexer (MUX). During the operation of the vibrating device 1, a voltage V3" shown in FIG. 9 is applied to the lid body 4, the conductor layer 6, and the edge section 5. The voltage V3" is a voltage whose potential periodically changes based on VDD/2. Moreover, the voltage V3" is at a potential of VDD/2 when time-averaged. In the embodiment, VDD and GND are inverted every detection period of each axis; however, the cycle of the voltage V3" is not particularly limited, and, for example, VDD and GND may be inverted every entire detection period of the three axes as shown in FIG. 10. Moreover, the voltage V3, which is constant at VDD/2, may be applied to the lid body 4, the conductor layer 6, and the edge section 5 as in the first embodiment described above.

The third embodiment also can exhibit advantageous effects similar to those of the first embodiment described above.

Fourth Embodiment

Next, a vibrating device module according to a fourth embodiment of the invention will be described.

FIG. 11 is a cross-sectional view showing the vibrating device module according to the fourth embodiment of the invention.

The vibrating device module 100 shown in FIG. 11 includes the vibrating device 1, the circuit element 8 (IC) electrically connected with the vibrating device 1, and a package 9 for accommodating the vibrating device 1 and the circuit element 8. The vibrating device 1 is not particularly limited; however, for example, the vibrating device 1 according to the first, second, or third embodiment can be used.

The circuit element 8 is disposed on the vibrating device 1. The circuit element 8 is bonded to the lid body 4 of the vibrating device 1 with a bonding member. Moreover, the circuit element 8 is electrically connected with each of the electrode pads P of the vibrating device 1 through a bonding wire BW1. The circuit element 8 includes, as desired, a drive circuit that drives the vibrating device 1, a detection circuit that detects acceleration based on an output signal from the vibrating device 1, and an output circuit that converts the signal from the detection circuit into a predetermined signal and outputs the predetermined signal.

Moreover, the circuit element 8 is electrically connected with the lid body 4 of the vibrating device 1 through a bonding wire B3. With this configuration, the voltage V3 can be applied from the circuit element 8 to the lid body 4.

The package 9 includes a base 91 supporting the vibrating device 1 through a bonding member 90, and a lid 92 bonded to the upper surface of the base 91 so as to form an accommodating space S1 for accommodating the vibrating device 1 and the circuit element 8 between the base 91 and the lid 92.

The base 91 forms a cavity shape including a recess 911 opened in the upper surface of the base 91. The recess 911 includes a first recess 911a opened in the upper surface of the base 91, and a second recess 911b opened in the bottom surface of the first recess 911a. On the other hand, the lid 92 has a plate shape, and is bonded to the upper surface of the base 91 so as to close the opening of the recess 911. The accommodating space S1 is formed by closing the opening of the recess 911 with the lid 92 as described above, and the vibrating device 1 and the circuit element 8 are accommodated in the accommodating space S1.

The accommodating space S1 is airtightly sealed, and is in the same atmosphere as the accommodating space S of the vibrating device 1. That is, in the embodiment, it is preferable that the accommodating space S1 is at a substantially atmospheric pressure, with an inert gas such as nitrogen, helium, or argon enclosed therein, at an operating temperature (approximately −40° C. to 120° C.). With this configuration, even if the accommodating space S and the accommodating space S1 communicate with each other due to breakdown of the airtightness of the accommodating space S, the atmosphere of the accommodating space S can be maintained as it is. Therefore, a change in the acceleration detection characteristic of the vibrating device 1 due to a change in the atmosphere of the accommodating space S can be reduced, which provides the vibrating device 1 capable of performing stable drive. The meaning of the term "same atmosphere" is not limited to the case where the atmospheres are completely the same as each other, but includes the case where unavoidable manufacturing errors are contained such as, for example, when the concentrations of gases enclosed in the spaces are slightly different or when the pressures in the spaces are slightly different.

The atmosphere of the accommodating space S1 may not be the same as that of the accommodating space S. For example, the atmosphere of the accommodating space S1 may be at the same pressure as that of the accommodating space S, but gas species enclosed in the accommodating space S1 may be different from that of the accommodating space S. Moreover, the atmosphere of the accommodating space S1 may be at a pressure different from that of the accommodating space S, but gas species enclosed in the accommodating space S1 may be the same as that of the accommodating space S. Moreover, the atmosphere of the accommodating space S1 may be at a pressure different from that of the accommodating space S, and gas species enclosed in the accommodating space S1 may be different from that of the accommodating space S.

The constituent material of the base 91 is not particularly limited, and, for example, various ceramics including oxide ceramics such as alumina, silica, titania, and zirconia, and nitride ceramics such as silicon nitride, aluminum nitride, and titanium nitride can be used. In this case, the base 91 can be manufactured by firing a stacked body of ceramic sheets (green sheets). By employing such a configuration, the recess 911 can be easily formed. In the embodiment, the base 91 is formed of a stacked body of six ceramic sheets.

Moreover, the constituent material of the lid 92 is not particularly limited; however, it is better to use a member whose linear expansion coefficient approximates to that of the constituent material of the base 91. For example, when the ceramics described above are used as the constituent material of the base 91, it is preferable to use an alloy such as Kovar.

As shown in FIG. 11, the base 91 includes a plurality of internal terminals 93 disposed on the bottom surface of the first recess 911a, and a plurality of external terminals 94 disposed on the lower surface of the base 91. Each of the internal terminals 93 is electrically connected with a predetermined external terminal 94 through an internal wiring line 95 disposed in the base 91. Moreover, each of the plurality of internal terminals 93 is electrically connected with the circuit element 8 through a bonding wire BW2. With this configuration, electrical connection to the circuit element 8 can be performed from the outside of the package 9, which makes it easy to mount the vibrating device module 100.

The vibrating device module 100 includes the vibrating device 1. Therefore, the vibrating device module 100 can have the advantageous effects of the vibrating device 1 described above, and can exhibit high reliability. The vibrating device 1 is not particularly limited, and, for example, the vibrating device 1 according to the first, second, or third embodiment can be used.

Fifth Embodiment

Next, a vibrating device module according to a fifth embodiment of the invention will be described.

Figure 12:
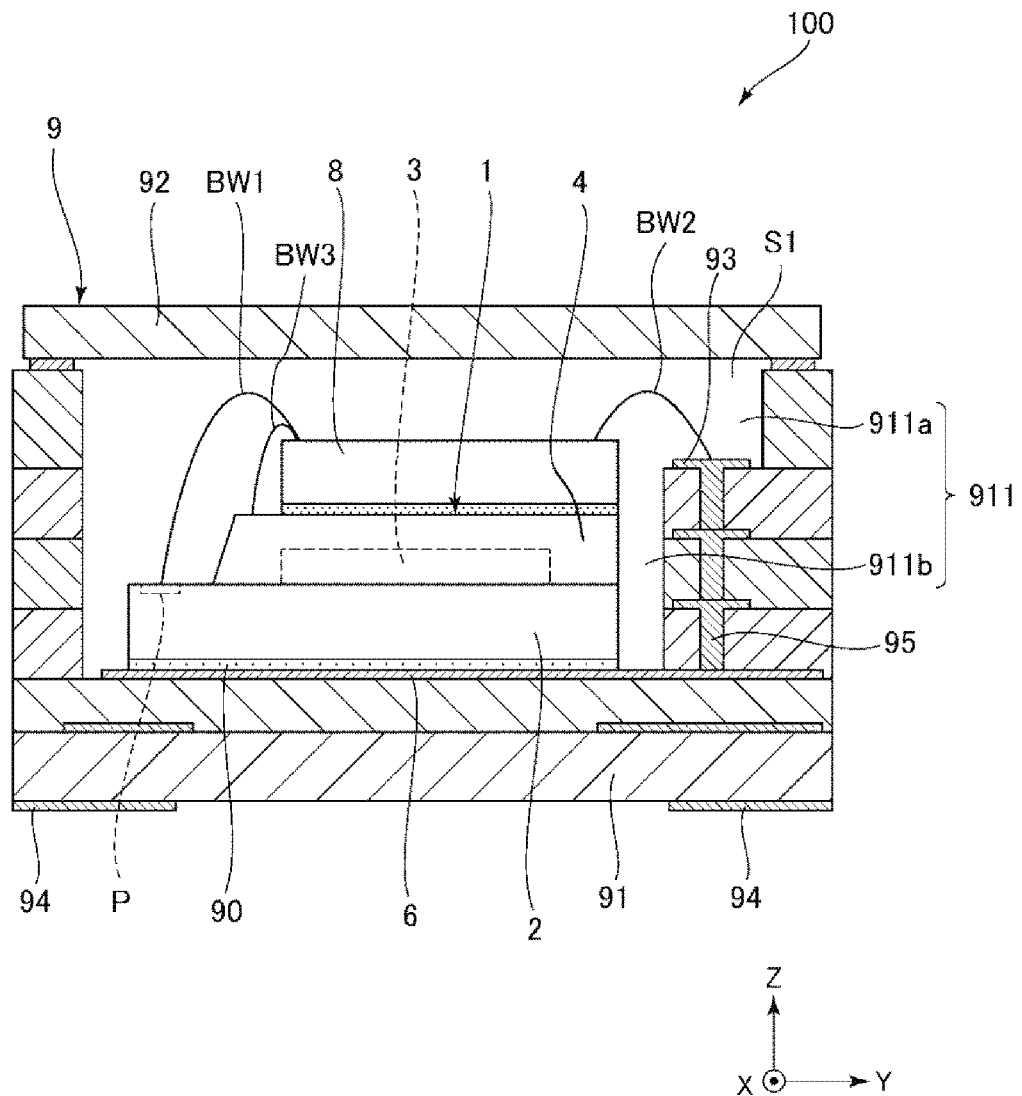
FIG. 12 is a cross-sectional view showing a vibrating device module according to a fifth embodiment of the invention.

FIG. 12 is a cross-sectional view showing the vibrating device module according to the fifth embodiment of the invention.

The vibrating device module 100 according to the embodiment is similar to the vibrating device module 100 according to the fourth embodiment described above except, mainly, that the arrangement of the conductor layer 6 is different.

In the following description, the vibrating device module 100 of the fifth embodiment will be described focusing on differences from the fourth embodiment described above, and the description of similar matters is omitted. In FIG. 12, configurations similar to those of the embodiments described above are denoted by the same reference numerals and signs.

As shown in FIG. 12, in the vibrating device module 100 of the embodiment, the conductor layer 6 is omitted from the lower surface of the base body 2, and instead, the conductor layer 6 is disposed on the bottom surface of the second recess 911b of the base 91. The vibrating device 1 (the base body 2) is bonded to the upper surface of the conductor layer 6 with an insulating bonding member 90. The bonding member 90 is not particularly limited, and, for example, various epoxy-based, acrylic-based, and silicone-based adhesives can be used.

The vibrating device module 100 includes the insulating layer disposed between the base body 2 and the conductor layer 6 as described above. This can exhibit the following advantageous effects. That is, by disposing the insulating layer between the base body 2 and the conductor layer 6, a capacitance is formed between the base body 2 and the conductor layer 6. With this configuration, a voltage applied to the base body 2 is capacitively divided between the capacitance formed between the movable member 32 and the exposed section of the recess 211 and the capacitance formed between the base body 2 and the conductor layer 6, and by that amount, electrostatic attraction occurring between the movable member 32 and the exposed section of the recess 211 is reduced compared to, for example, the first embodiment described above. Thus, the rocking of the movable member 32 in the state where the acceleration Az is not applied can be reduced. Therefore, according to the vibrating device 1, output drift can be reduced, and the acceleration Az can be accurately detected.

The fifth embodiment also can exhibit advantageous effects similar to those of the fourth embodiment described above.

Sixth Embodiment

Next, a vibrating device module according to a sixth embodiment of the invention will be described.

Figure 13:
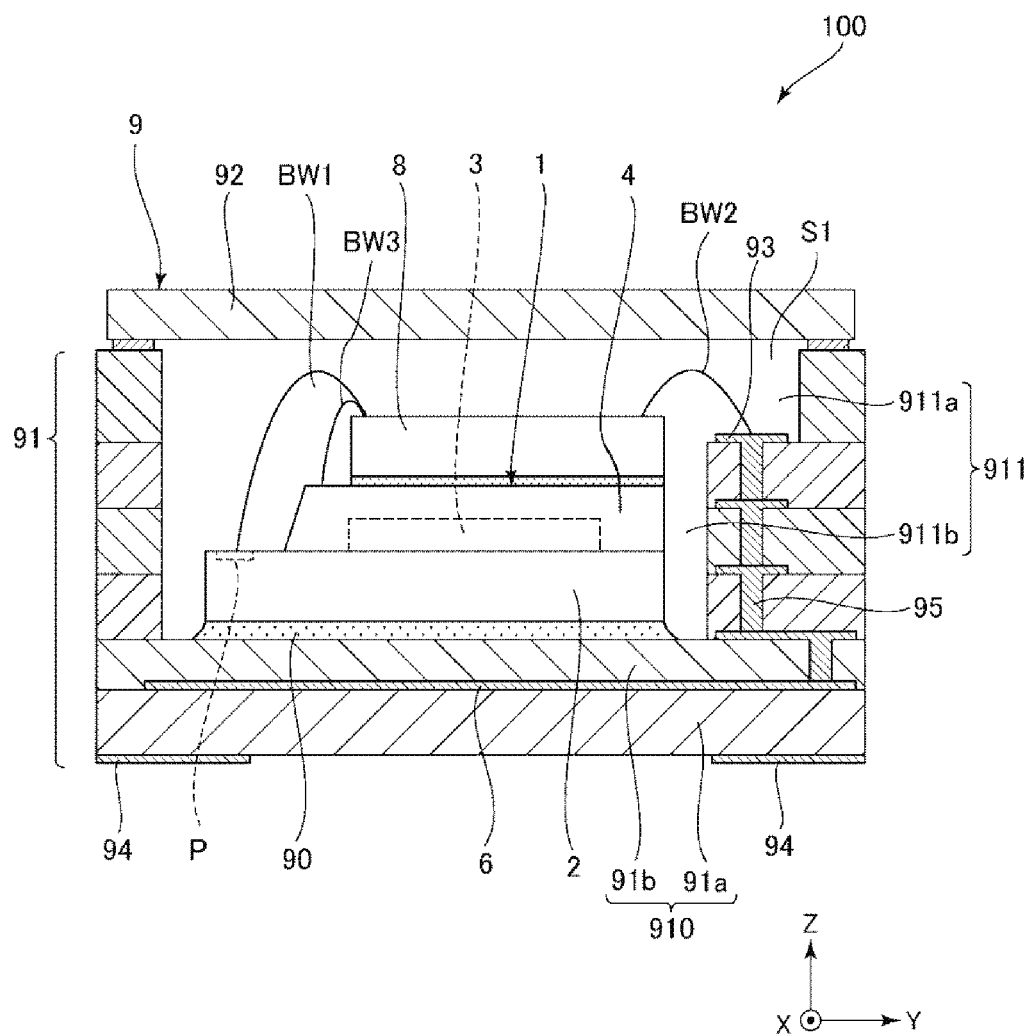
FIG. 13 is a cross-sectional view showing a vibrating device module according to a sixth embodiment of the invention.

FIG. 13 is a cross-sectional view showing the vibrating device module according to the sixth embodiment of the invention.

The vibrating device module 100 according to the embodiment is similar to the vibrating device module 100 according to the fifth embodiment described above except, mainly, that the arrangement of the conductor layer 6 is different.

In the following description, the vibrating device module 100 of the sixth embodiment will be described focusing on differences from the fifth embodiment described above, and the description of similar matters is omitted. In FIG. 13, configurations similar to those of the embodiments described above are denoted by the same reference numerals and signs.

As shown in FIG. 13, in the vibrating device module 100 of the embodiment, the conductor layer 6 is embedded in the base 91. Specifically, the conductor layer 6 is disposed between a first insulating layer 91a and a second insulating layer 91b that constitute the bottom section (a support substrate 910 supporting the vibrating device 1) of the base 91. That is, the conductor layer 6 is configured of the internal wiring line 95. In the configuration described above, an insulating layer composed of the bonding member 90 and the second insulating layer 91b intervenes between the base body 2 and the conductor layer 6.

The sixth embodiment also can exhibit advantageous effects similar to those of the fifth embodiment described above.

Seventh Embodiment

Next, an electronic apparatus according to a seventh embodiment of the invention will be described.

Figure 14:
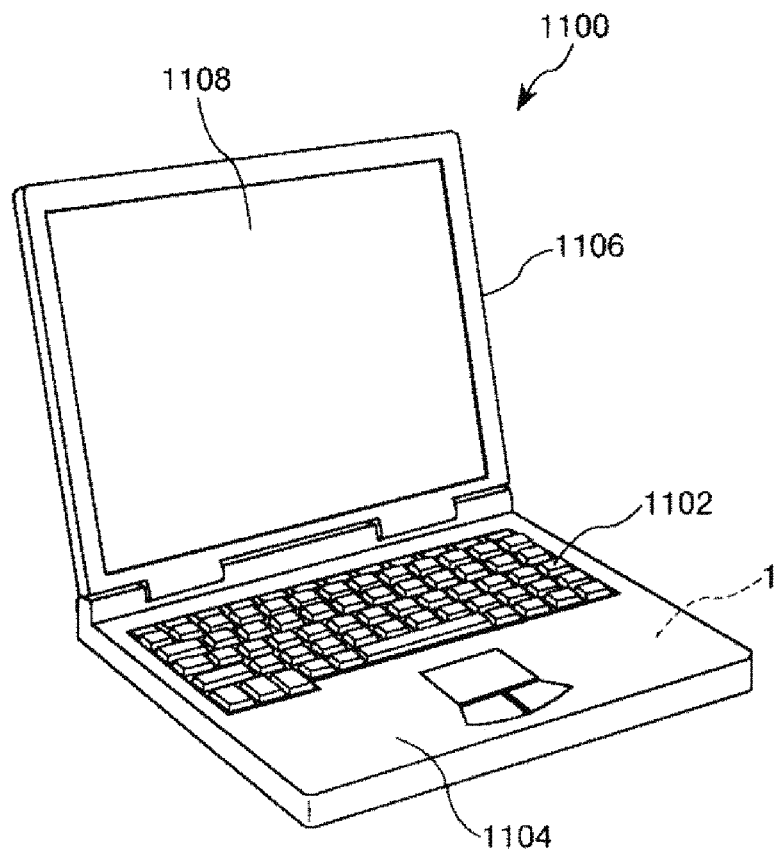
FIG. 14 is a perspective view showing an electronic apparatus according to a seventh embodiment of the invention.

FIG. 14 is a perspective view showing the electronic apparatus according to the seventh embodiment of the invention.

A mobile (or notebook) personal computer 1100 shown in FIG. 14 is a personal computer to which the electronic apparatus including the vibrating device according to the invention is applied. In the drawing, the personal computer 1100 is configured of a main body section 1104 including a keyboard 1102, and a display unit 1106 including a display section 1108. The display unit 1106 is rotatably supported to the main body section 1104 through a hinge structure section. The vibrating device 1 functioning as an acceleration sensor is incorporated into the personal computer 1100. Here, as the vibrating device 1, for example, any of the vibrating devices 1 according to the first, second, and third embodiments can be used.

The personal computer 1100 (electronic apparatus) includes the vibrating device 1. Therefore, the personal computer 1100 can have the advantageous effects of the vibrating device 1 described above, and can exhibit high reliability. The vibrating device 1 may be incorporated, as the vibrating device module 100 such as in, for example, the fourth, fifth, or sixth embodiment described above, into the personal computer 1100.

Eighth Embodiment

Next, an electronic apparatus according to an eighth embodiment of the invention will be described.

Figure 15:
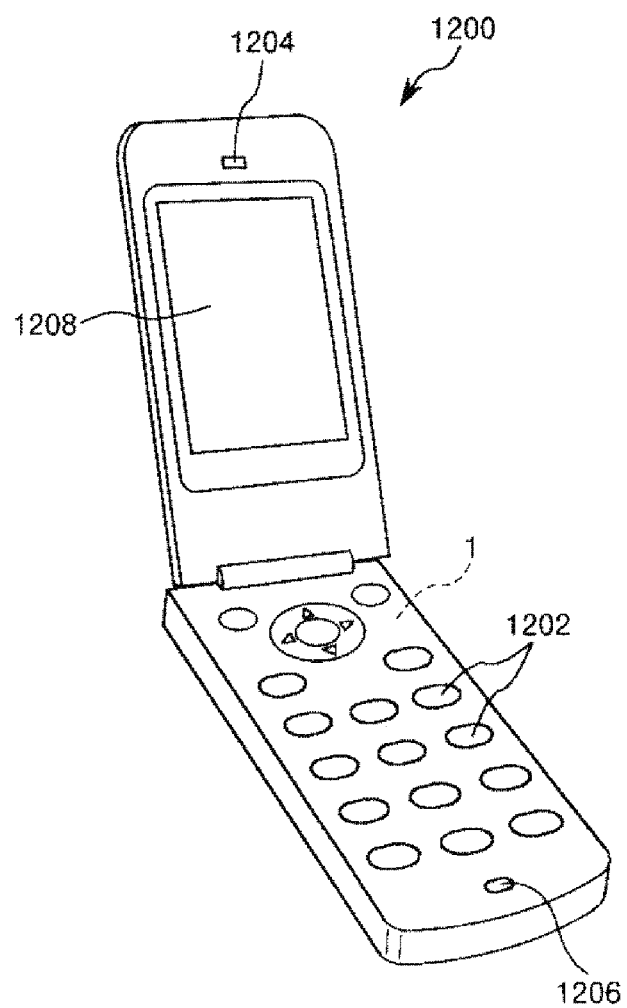
FIG. 15 is a perspective view showing an electronic apparatus according to an eighth embodiment of the invention.

FIG. 15 is a perspective view showing the electronic apparatus according to the eighth embodiment of the invention.

A mobile phone 1200 (including a PHS) shown in FIG. 15 is a mobile phone to which the electronic apparatus including the vibrating device according to the invention is applied. In the drawing, the mobile phone 1200 includes an antenna (not shown), a plurality of operating buttons 1202, an earpiece 1204, and a mouthpiece 1206. A display section 1208 is disposed between the operating buttons 1202 and the earpiece 1204. The vibrating device 1 functioning as an acceleration sensor is incorporated into the mobile phone 1200. Here, as the vibrating device 1, for example, any of the vibrating devices 1 according to the first, second, and third embodiments can be used.

The mobile phone 1200 (electronic apparatus) includes the vibrating device 1. Therefore, the mobile phone 1200 can have the advantageous effects of the vibrating device 1 described above, and can exhibit high reliability. The vibrating device 1 may be incorporated, as the vibrating device module 100 such as in, for example, the fourth, fifth, or sixth embodiment described above, into the personal computer 1100.

Ninth Embodiment

Next, an electronic apparatus according to a ninth embodiment of the invention will be described.

Figure 16:
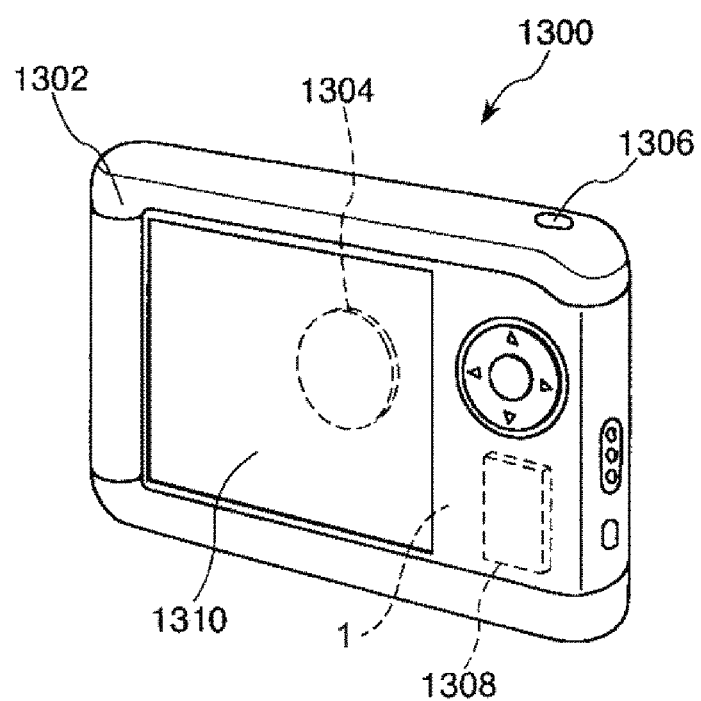
FIG. 16 is a perspective view showing an electronic apparatus according to a ninth embodiment of the invention.

FIG. 16 is a perspective view showing the electronic apparatus according to the ninth embodiment of the invention.

A digital still camera 1300 shown in FIG. 16 is a digital still camera to which the electronic apparatus including the vibrating device according to the invention is applied. In the drawing, a display section 1310 is provided on the back surface of a case (body) 1302, and is configured to perform display based on an imaging signal through a CCD. The display section 1310 functions as a finder that displays a subject as an electronic image. On the front surface side (the rear surface side in the drawing) of the case 1302, a light receiving unit 1304 including an optical lens (imaging optical system) and the CCD is provided. When a photographer checks a subject image displayed on the display section 1310 and presses a shutter button 1306, an imaging signal of the CCD at the time is transferred to and stored in a memory 1308. The vibrating device 1 functioning as an acceleration sensor is incorporated into the digital still camera 1300. Here, as the vibrating device 1, for example, any of the vibrating devices 1 according to the first, second, and third embodiments can be used.

The digital still camera 1300 (electronic apparatus) includes the vibrating device 1. Therefore, the digital still camera 1300 can have the advantageous effects of the vibrating device 1 described above, and can exhibit high reliability. The vibrating device 1 may be incorporated, as the vibrating device module 100 such as in, for example, the fourth, fifth, or sixth embodiment described above, into the digital still camera 1300.

The electronic apparatus according to the invention can be applied to, in addition to the personal computer and the mobile phone of the embodiments described above and the digital still camera of the embodiment, electronic apparatuses such as, for example, a smartphone, a tablet terminal, a watch (including a smartwatch), an inkjet-type discharge apparatus (e.g., an inkjet printer), a laptop personal computer, a television set, a wearable terminal such as a head-mounted display (HMD), a video camcorder, a video tape recorder, a car navigation system, a pager, an electronic notebook (including that with a communication function), an electronic dictionary, a calculator, an electronic gaming machine, a word processor, a workstation, a videophone, a surveillance TV monitor, electronic binoculars, a POS terminal, a medical device (e.g., an electronic thermometer, a sphygmomanometer, a blood glucose meter, an electrocardiogram measuring system, an ultrasonic diagnosis apparatus, and an electronic endoscope), a fishfinder, various measuring instruments, an apparatus for a mobile terminal base station, gauges (e.g., gauges used in a vehicle, an airplane, and a ship), a flight simulator, and a network server.

Tenth Embodiment

Next, a vehicle according to a tenth embodiment of the invention will be described.

Figure 17:
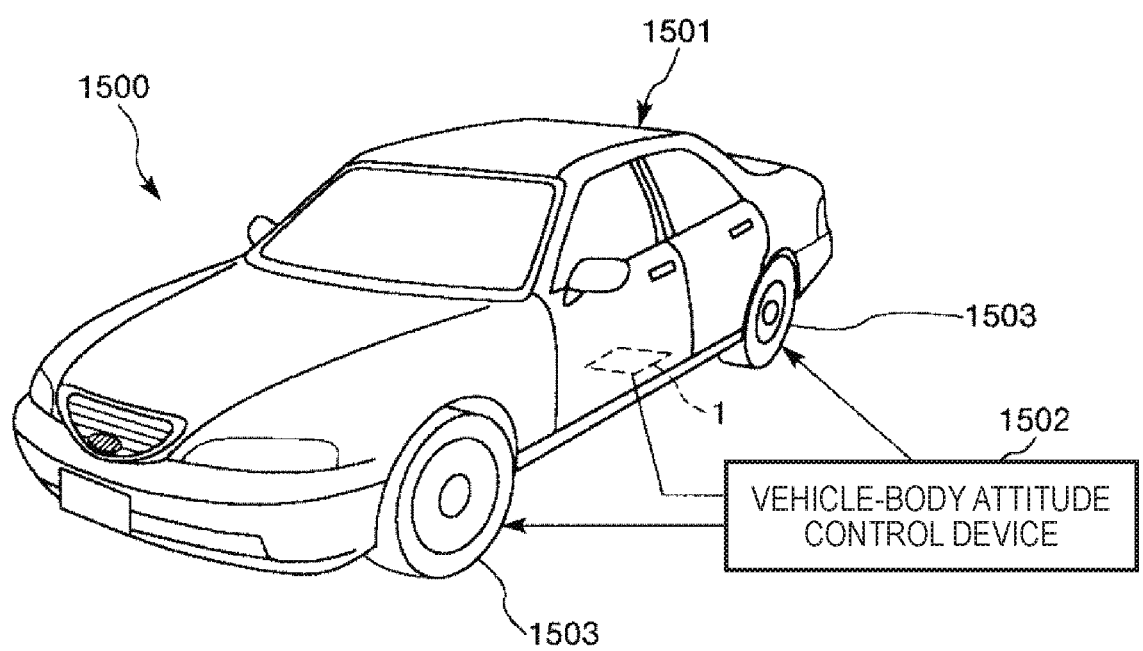
FIG. 17 is a perspective view showing a vehicle according to a tenth embodiment of the invention.

FIG. 17 is a perspective view showing the vehicle according to the tenth embodiment of the invention.

An automobile 1500 shown in FIG. 17 is an automobile to which the vehicle including the vibrating device according to the invention is applied. In the drawing, the vibrating device 1 functioning as an acceleration sensor is incorporated into the automobile 1500, and the attitude of a vehicle body 1501 can be detected by the vibrating device 1. A detection signal of the vibrating device 1 is supplied to a vehicle-body attitude control device 1502. The vehicle-body attitude control device 1502 can detect the attitude of the vehicle body 1501 based on the signal, and control the hardness and softness of a suspension in response to a result of the detection or control a brake of each wheel 1503. Here, as the vibrating device 1, for example, any of the vibrating devices 1 according to the first, second, and third embodiments can be used.

The automobile 1500 (vehicle) includes the vibrating device 1. Therefore, the automobile 1500 can have the advantageous effects of the vibrating device 1 described above, and can exhibit high reliability. The vibrating device 1 may be incorporated, as the vibrating device module 100 such as in, for example, the fourth, fifth, or sixth embodiment described above, into the automobile 1500.

In addition, the vibrating device 1 can be widely applied to electronic control units (ECUs) such as for a car navigation system, a car air-conditioner, an anti-lock brake system (ABS), an air bag, a tire pressure monitoring system (TPMS), engine control, and a battery monitor of a hybrid automobile or an electric automobile.

Moreover, the vehicle is not limited to the automobile 1500, and can be applied also to, for example, an airplane, a rocket, an artificial satellite, a ship, an automated guided vehicle (AGV), a bipedal walking robot, and an unmanned airplane such as a drone.

The vibrating device, the vibrating device module, the electronic apparatus, and the vehicle according to the invention have been described above based on the embodiments shown in the drawings. However, the invention is not limited to the embodiments, and the configuration of each part can be replaced with any configuration having a similar function. Moreover, any other component may be added to the invention. Moreover, the embodiments described above may be appropriately combined together.

Moreover, in the embodiments described above, a configuration in which the conductor layer, the lid body, and the edge section are disposed has been described as the conductor section; however, the configuration of the conductor section is not particularly limited as long as the conductor section is disposed so as to cover at least a portion of the movable member. For example, one or two of the conductor layer, the lid body, and the edge section may be omitted.

Moreover, in the embodiments described above, an acceleration sensor that detects acceleration has been described as the vibrating device; however, the vibrating device is not particularly limited. The vibrating device may be, for example, a sensor that detects angular velocity, pressure, or the like, or may be a vibrator used in an oscillator or the like.

The entire disclosure of Japanese Patent Application No. 2017-124208 filed Jun. 26, 2017 is expressly incorporated by reference herein.

What is claimed is:

1. A vibrating device comprising:
   a base body containing mobile ions;
   a movable member overlapping the base body in a plan view, the movable member being configured to selectively receive a first voltage; and
   a conductor overlapping the movable member in the plan view, the conductor being configured to selectively receive a second voltage,
   wherein the first voltage has a potential that periodically changes based on a reference potential, and
   the second voltage is at a time-averaged value of the reference potential.

2. The vibrating device according to claim 1, wherein the second voltage is constant.

3. The vibrating device according to claim 1, further comprising:
   an electrode on the base body, the electrode facing the movable member,
   wherein the movable member is rotatably displaceable toward the base body, and
   the electrode is configured to output an electrical signal in response to a displacement of the movable member.

4. The vibrating device according to claim 3, wherein the electrode is configured to receive the second voltage.

5. The vibrating device according to claim 1, further comprising:
   a conductor layer on the base body, the conductor layer being on an opposite side of the base body as the movable member.

6. The vibrating device according to claim 1, wherein the conductor includes a lid body bonded to the base body and accommodating the movable member between the base body and the lid body.

7. The vibrating device according to claim 1, wherein the conductor includes a perimeter wall connected to the base body and extending adjacently along at least a portion of the movable member in a plan view.

8. A vibrating device module comprising:
   a vibrating device including:
     a base body containing mobile ions;
     a movable member overlapping the base body in a plan view, the movable member being configured to selectively receive a first voltage; and
     a conductor overlapping the movable member in the plan view, the conductor being configured to selectively receive a second voltage,
     wherein the first voltage has a potential that periodically changes based on a reference potential, and
     the second voltage is at a time-averaged value of the reference potential; and
   a circuit electrically connected with the vibrating device.

9. The vibrating device module according to claim 8, further comprising:
   a conductor layer on a side of the base body opposite to the movable member, and
   an insulating layer between the base body and the conductor layer.

10. The vibrating device module according to claim 8, further comprising:
    a support substrate supporting the vibrating device,
    wherein the support substrate includes:
      a first insulating layer, and
      a second insulating layer on one side of the first insulating layer, and
    at least a portion of the conductor is disposed between the first insulating layer and the second insulating layer.

11. A vibrating device comprising:
    a base containing mobile ions;
    a post upstanding from the base;
    a conductive proof mass having an anchor mounted to the post, torsion beams laterally extending from the anchor, and a movable member pivotally supported in a spaced apart relation relative to the base by the torsion beams, the torsion beams defining a pivot axis asymmetrically dividing the movable member into first and second longitudinally extending platforms;
    a first detection electrode on the base, the first detection electrode facing the first platform;
    a second detection electrode on the base, the second detection electrode facing a proximal face of the second platform, the proximal face being adjacent the post, the first and second detection electrodes being configured to output an electrical signal in response to the pivoting of the movable member relative to the base;
    a dummy electrode on the base, the dummy electrode facing a distal face of the second platform, the distal face being spaced away from the post;
    a conductive lid bonded to the base and accommodating the proof mass in a space between the base and the lid; and
    a conductive layer on an opposite side of the base as the movable member,
    wherein the movable member is configured to receive a first voltage,
    at least one of the conductive lid and the conductive layer is configured to receive a second voltage,
    the first voltage has a potential that periodically changes based on a reference potential, and
    the second voltage is at a time-averaged value of the reference potential.

12. The vibrating device according to claim 11, wherein the second voltage is constant.

13. The vibrating device according to claim 12, wherein the first and second detection electrodes are configured to receive the second voltage.

14. The vibrating device according to claim 11, wherein the first and second detection electrodes are configured to receive the second voltage.

15. The vibrating device according to claim 11, further comprising:
    a conductive perimeter wall upstanding from the base in the space and extending adjacently along a peripheral edge of the movable member, the conductive perimeter wall being configured to receive the second voltage.

16. The vibrating device according to claim 11, wherein both the conductive lid and the conductive layer receive the second voltage.

17. The vibrating device according to claim 11, further comprising:
    a conductive perimeter wall upstanding from the base in the space and extending adjacently along a peripheral edge of the movable member, the conductive perimeter wall being configured to receive the second voltage, and
    wherein the conductive lid, the conductive layer and the conductive perimeter wall all receive the second voltage.

18. The vibrating device according to claim 11, wherein the conductive layer is bonded directly to the base.

19. The vibrating device according to claim 11, further comprising:
   an insulating layer between the base and the conductive layer.

20. The vibrating device according to claim 11, further comprising:
   a support substrate supporting the base,
   wherein the support substrate includes:
      a first insulating layer, and
      a second insulating layer on one side of the first insulating layer, and
   the conductive layer is disposed between the first insulating layer and the second insulating layer.

* * * * *